US012783932B2

(12) United States Patent
Kim et al.

(10) Patent No.: US 12,783,932 B2
(45) Date of Patent: Nov. 3, 2026

(54) TWO-LEVEL-SYSTEM ENVIRONMENT MODULATION FOR QUANTUM ERROR CORRECTION

(71) Applicant: International Business Machines Corporation, Armonk, NY (US)

(72) Inventors: Youngseok Kim, Montvale, NJ (US); Malcolm Scott Carroll, Cranbury, NJ (US); David Zajac, Valley Cottage, NY (US); Abhinav Kandala, Yorktown Heights, NY (US); Martin O. Sandberg, Ossining, NY (US); Jiri Stehlik, New York, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 73 days.

(21) Appl. No.: 18/914,553

(22) Filed: Oct. 14, 2024

(65) Prior Publication Data

US 2026/0105345 A1 Apr. 16, 2026

(51) Int. Cl.
*H03M 13/00* (2006.01)
*G06N 10/70* (2022.01)

(52) U.S. Cl.
CPC .................................... *G06N 10/70* (2022.01)

(58) Field of Classification Search
CPC ...................................................... G06N 10/70
See application file for complete search history.

(56) References Cited

U.S. PATENT DOCUMENTS 11,521,104 B2 12/2022 Delfosse et al.
11,842,250 B2 * 12/2023 Zheng .................... G06N 10/70
(Continued)

FOREIGN PATENT DOCUMENTS

WO 2020181116 A1 9/2020
WO 2023057679 A1 4/2023
WO 2025/247552 A1 12/2025

OTHER PUBLICATIONS

List of IBM Patents or Applications Treated as Related.
(Continued)

*Primary Examiner* — Esaw T Abraham
(74) *Attorney, Agent, or Firm* — Amin, Turocy & Watson, LLP

(57) ABSTRACT

Systems, computer program products and/or computer-implemented methods for qubit-TLS environment modulation for quantum error correction (QEC) are provided. A system can comprise a memory that can store computer-executable components and can comprise a processor that executes at least one of the computer executable components that can execute a quantum circuit for QEC that comprises fault-tolerant operation cycles comprising of syndrome measurements; obtain error information from the syndrome measurements or decoded information from a decoder; and modulate, based on the error information and via modulation of a TLS knob, a qubit-TLS environment during execution of the quantum circuit or after execution of a series of the fault-tolerant operation cycles in response to a detection of errors, wherein modulating the qubit-TLS environment during execution comprises modulating the TLS knob with a calibrated time variation, and wherein modulating the qubit-TLS environment after execution comprises post-processing measurement outcomes based on the error information.

20 Claims, 16 Drawing Sheets

(56) References Cited

U.S. PATENT DOCUMENTS

| | | | | |
|---|---|---|---|---|
| 11,875,222 | B1 * | 1/2024 | Reagor | G06N 10/20 |
| 12,141,660 | B2 * | 11/2024 | Jiang | H04L 1/0041 |
| 12,288,135 | B2 * | 4/2025 | Puri | G06N 10/70 |
| 12,475,403 | B2 * | 11/2025 | Lee | G06N 10/70 |
| 2022/0382632 | A1 | 12/2022 | Fowler | |
| 2023/0010205 | A1 * | 1/2023 | Sank | G01R 33/0358 |
| 2023/0054273 | A1 | 2/2023 | Ryan-Anderson et al. | |
| 2023/0267355 | A1 | 8/2023 | Kelly | |
| 2023/0359912 | A1 | 11/2023 | Das et al. | |
| 2024/0311673 | A1 * | 9/2024 | Salim | G06N 3/09 |
| 2025/0371395 | A1 | 12/2025 | Dane et al. | |

OTHER PUBLICATIONS

Lin, et al. "Codesign of quantum error-correcting codes and modular chiplets in the presence of defects" arXiv:2305.00138v3 [quant-ph] Mar. 22, 2024, 16 pages.

Auger, et al. "Fault-tolerance thresholds for the surface code with fabrication errors" arXiv:1706.04912v1 [quant-ph] Jun. 15, 2017, 10 pages.

Yang, et al. "Locating Two-Level Systems in a Superconducting Xmon Qubit" Appl. Sci. 2023, 13, 6672, 9 pages.

Wootton, et al. "A proposal for a minimal surface code experiment" arXiv:1608.05053v3 [quant-ph] Feb. 27, 2017, 9 pages.

Burnett, et al. "Evidence for interacting two-level systems from the 1/f noise of a superconducting resonator" Nat. Commun. 5:4119 (2014), arXiv:1311.1655v1 [cond-mat.mes-hall] Nov. 7, 2013, 7 pages.

Lisenfeld, et al. "Observation of directly interacting coherent two-level systems in a solid" Nature Communications 6, 6182 (2015), arXiv:1503.03681v1 [cond-mat.mes-hall] Mar. 12, 2015, 13 pages.

Carroll, et al. "Dynamics of superconducting qubit relaxation times" npj Quantum Inf 8, 132 (2022), arXiv:2105.15201v2 [quant-ph] Jun. 28, 2022, 18 pages.

Wang, et al. "DGR: Tackling Drifted and Correlated Noise in Quantum Error Correction via Decoding Graph Re-weighting" arXiv:2311.16214v3 [quant-ph] Apr. 22, 2024, 14 pages.

Spitz, et al. "Adaptive weight estimator for quantum error correction" arXiv:1712.02360v1 [quant-ph] Dec. 6, 2017, 6 pages.

Lisenfeld, et al., Electric field spectroscopy of material defects in transmon qubits; NPJ Quantum Information; 2019, 6 pages.

Lisenfeld, et al. Enhancing the coherence of superconducting quantum bits with electric fields; NPJ Quantum Information; 2023, 5 pages.

Preskill, John "Quantum Computing in the NISQ era and beyond" arXiv:1801.00862v3 [quant-ph] Jul. 31, 2018, 20 pages.

Bharti, et al. "Noisy intermediate-scale quantum (NISQ) algorithms" arXiv:2101.08448v2 [quant-ph] Oct. 6, 2021, 91 pages.

Temme, et al. "Error mitigation for short-depth quantum circuits" arXiv:1612.02058v3 [quant-ph] Nov. 6, 2017, 15 pages.

Li, et al. "Efficient variational quantum simulator incorporating active error minimisation" arXiv:1611.09301v5 [quant ph] Jun. 19, 2017, 14 pages.

Kim, et al. "Scalable error mitigation for noisy quantum circuits produces competitive expectation values" arXiv:2108.09197v1 [quant-ph] Aug. 20, 2021, 16 pages.

Van Den Berg, et al. "Probabilistic error cancellation with sparse Pauli-Lindblad models on noisy quantum processors" arXiv:2201.09866v2 [quant-ph] Jun. 23, 2022, 29 pages.

Filippov, et al. "Scalable tensor-network error mitigation for near-term quantum computing" arXiv:2307.11740v2 [quant-ph] Jul. 24, 2023, 31 pages.

De Graaf, et al. "Direct identification of dilute surface spins on Al2O3: Origin of flux noise in quantum circuits" http://arxiv.org/abs/1609.04562v1 [quant-ph] Sep. 15, 2016, 12 pages.

Klimov, et al. "Fluctuations of Energy-Relaxation Times in Superconducting Qubits" arXiv:1809.01043 [quant-ph], 2018, 21 pages.

De Graaf, et al. "Two-level systems in superconducting quantum devices due to trapped quasiparticles" arXiv:2004.02485v1[cond-mat.supr-con] Apr. 6, 2020, 25 pages.

Carroll, et al. "Dynamics of superconducting qubit relaxation times" arXiv:2105.15201v2 [quant-ph] Jun. 28, 2022, 18 pages.

Thorbeck, et al. "TLS Dynamics in a Superconducting Qubit Due to Background Ionizing Radiation" arXiv:2210.04780v1 [quant-ph] Oct. 10, 2022, 14 pages.

Thorbeck, et al. "Readout-induced suppression and enhancement of superconducting qubit lifetimes" arXiv:2305.10508v1[quant-ph] May 17, 2023, 10 pages.

Sarabi, et al. "Projected dipole moments of individual two-level defects extracted using circuit quantum electrodynamics" arXiv:1501.05865v3 [cond-mat.supr-con] Apr. 5, 2016, 5 pages.

Lisenfeld, et al. "Electric field spectroscopy of material defects in transmon qubits" arXiv:1909.09749v2 [cond-mat.supr-con] Nov. 28, 2019, 16 pages.

Abdurakhimov, et al. "Driven-state relaxation of a coupled qubit-defect system in spin-locking measurements" http://arxiv.org/abs/2006.05820v2[quant-ph] Aug. 14, 2020, 14 pages.

Mckay, et al. "A universal gate for fixed-frequency qubits via a tunable bus" http://arxiv.org/abs/1604.03076v3 [quant-ph], Dec. 19, 2016, 10 pages.

Grabovskij, et al. "Strain Tuning of Individual Atomic Tunneling Systems Detected by a Superconducting Qubit" Science, vol. 338, Oct. 12, 2012, 3 pages.

Stehlik, et al. "Tunable Coupling Architecture for Fixed-frequency Transmons" arXiv:2101.07746v1 [quant-ph] Jan. 19, 2021, 7 pages.

Van Den Berg, et al. "Model-free readout-error mitigation for quantum expectation values" arXiv:2012.09738v3 [quant-ph] Jan. 27, 2022, 8 pages.

Chen, et al. "The learnability of Pauli noise" arXiv:2206.06362v2 [quant-ph] Dec. 23, 2022, 33 pages.

Kandala, et al. "Error mitigation extends the computational reach of a noisy quantum processor" Nature, vol. 567, Mar. 28, 2019, 11 pages.

Kim et al., "Evidence for the Utility of Quantum Computing Before Fault Tolerance", Nature, vol. 618, Jun. 15, 2023, pp. 500-507.

International Searching Authority, "Notification of Transmittal of the International Search Report and the Written Opinion of the International Searching Authority, or the Declaration", International Application No. PCT/EP2025/060290, Jul. 8, 2025, 12 pages.

Muller et al., "Interacting Two-Level Defects as Sources of Fluctuating High-Frequency Noise in Superconducting Circuits", Physical Review B 92, 035442 (2015), 13 pages.

Wu et al., "Controllable Dynamics of a Dissipative Two-Level System", Nature Scientific Reports, (2021) 11:7188, 9 pages.

Kelly, Scalable in situ qubit calibration during repetitive error detection, pp. 1-8, (Year: 2016).

Li, Motional averaging in a superconducting qubit, pp. 1-6, (Year: 2013).

Non-Final Rejection Mailed on Aug. 4, 2026 for U.S. Appl. No. 18/678,182, 16 page(s).

Preda Broadband pump-probe spectroscopy at 20-MHz modulation frequency, (Year: 2016).

Shaniv, Quantum lock-in force sensing using optical clock Doppler velocimetry, pp. 1-5, (Year: 2017).

* cited by examiner

900

| BIAS RANGES 902 | | | | | | EVENT 904 |
|---|---|---|---|---|---|---|
| $B_1$-$B_2$ | $B_2$-$B_3$ | $B_3$-$B_4$ | $B_4$-$B_5$ | $B_5$-$B_6$ | ... | |
| 2 | 1 | TLS | 2 | TLS | | START 906 |
| TLS | 1 | TLS | 2 | TLS | | DEFECT DETECTED 908 |
| ... | | | | | | |

910 912 914

FIG. 9

TWO-LEVEL-SYSTEM ENVIRONMENT MODULATION FOR QUANTUM ERROR CORRECTION

BACKGROUND

The subject disclosure relates to quantum error correction, and more specifically to modulation of a two-level-system (TLS) environment for quantum error correction (QEC).

SUMMARY

The following presents a summary to provide a basic understanding of one or more embodiments described herein. This summary is not intended to identify key or critical elements, delineate scope of particular embodiments or scope of claims. Its sole purpose is to present concepts in a simplified form as a prelude to the more detailed description that is presented later. In one or more embodiments described herein, systems, computer-implemented methods, apparatus and/or computer program products that enable modulation of a two-level-system (TLS) environment, via modulation of a TLS knob, for quantum error correction (QEC) are discussed.

According to an embodiment, a system is provided. The system can comprise a memory that can store computer-executable components. The system can further comprise a processor that executes at least one of the computer executable components that can execute, on a quantum system, a quantum circuit for quantum error correction that comprises a multiplicity of fault-tolerant operation cycles comprising of quantum gates and syndrome measurements. The at least one of the computer executable components can further obtain error information from the syndrome measurements and decoded information from a decoder that is pre-calibrated. The at least one of the computer executable components can further modulate, based on the decoded information and via modulation of a TLS knob, a qubit-TLS environment during execution of the quantum circuit or after execution of a series of fault-tolerant operation cycles in response to a detection of errors, wherein modulating the qubit-TLS environment during execution of the quantum circuit comprises modulating the TLS knob with a calibrated time variation, and wherein modulating the qubit-TLS environment after execution of the series of fault-tolerant operation cycles comprises post-processing measurement outcomes based on syndrome measurements or decoded information.

According to various embodiments, the above-described system can be implemented as a computer-implemented method or as a computer program product.

BRIEF DESCRIPTION OF THE DRAWINGS

One or more embodiments are described below in the Detailed Description section with reference to the following drawings:

FIG. 9 illustrates an example, non-limiting bias lookup table in accordance with one or more embodiments described herein.

DETAILED DESCRIPTION

Figure 1:
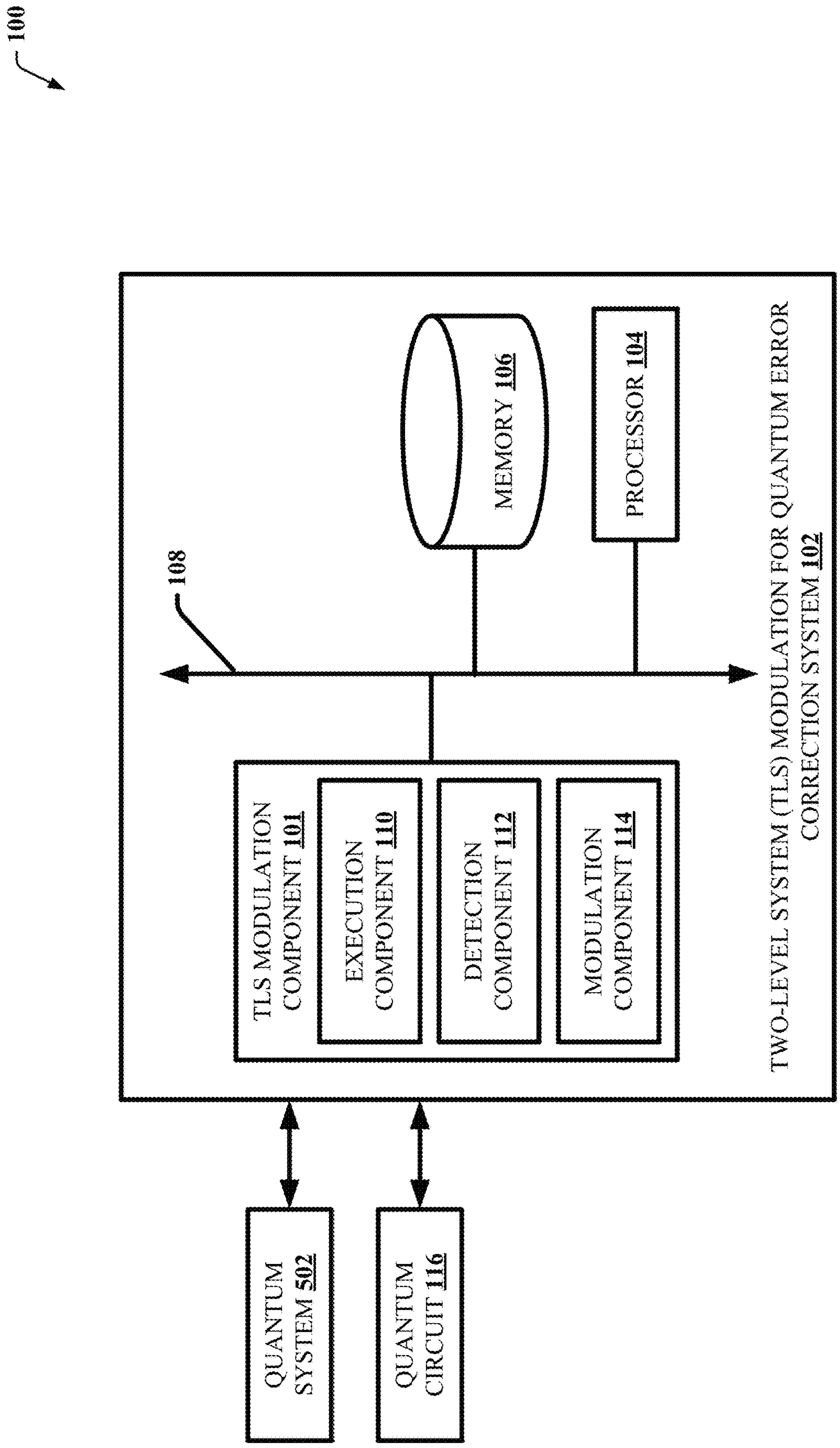
FIG. 1 illustrates a block diagram of an example, non-limiting system that can facilitate modulation of qubit-TLS environments for quantum error correction in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, where like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

According to an embodiment, a system is provided. The system can comprise a memory that can store computer-executable components. The system can further comprise a processor that executes at least one of the computer executable components that can execute, on a quantum system, a quantum circuit for quantum error correction that comprises a multiplicity of fault-tolerant operation cycles comprising of quantum gates and syndrome measurements. The at least one of the computer executable components can further obtain error information from the syndrome measurements and decoded information from a decoder that is pre-calibrated. The at least one of the computer executable components can further modulate, based on the decoded information and via modulation of a TLS knob, a qubit-TLS environment during execution of the quantum circuit or after execution of a series of fault-tolerant operation cycles in response to a detection of errors, wherein modulating the qubit-TLS environment during execution of the quantum circuit comprises modulating the TLS knob with a calibrated time variation, and wherein modulating the qubit-TLS environment after execution of the series of fault-tolerant operation cycles comprises post-processing measurement outcomes based on syndrome measurements or decoded information. Such embodiments of the system can provide a number of advantages, including reducing computational overhead, increasing stability of qubits, reducing computational time of quantum experiments, reducing quantum noise, and enabling scalability of quantum circuits for quantum error correction.

In one or more embodiments of the aforementioned system, the at least one of the computer executable components can further: modify a value of the TLS knob based on a threshold of performance in response to the detection of errors; and modify a noise model of the decoder in response to the detection of errors. Such embodiments of the system provide the advantage of increasing stability of qubits and reducing quantum noise.

In some embodiments of the aforementioned system, the at least one of the computer executable components can further: select a set of parameters based on prior measurements before the execution of the quantum circuit to repair a qubit or the quantum gates in response to the detection of errors; or exclude inoperable qubits or inoperable quantum gates from quantum error correction code by applying code deformation. Such embodiments of the system provide the advantage of reducing error rates and stabilizing qubits from TLS defects.

In one or more embodiments of the aforementioned system, the at least one of the computer executable components can further: repair, on the quantum system, a qubit or the quantum gates in response to the detection of errors, wherein repairing the qubit or the quantum gates comprises: swapping the qubit or the quantum gates with an error-free qubit tile; and swapping the error-free qubit tile with the qubit or the quantum gates in response to correcting the errors of the qubit or the quantum gates. Such embodiments of the system provide the advantage of enabling scalability of quantum circuits for quantum error correction, reducing error rates and stabilizing qubits from TLS defects.

In various embodiments of the aforementioned system, modulating the qubit-TLS environment after execution of the quantum circuit can comprise: executing, on the quantum system, one or more quantum circuits; collecting the syndrome measurements or the decoded information from fault-tolerant operations cycles in one or more quantum circuits; detecting the errors based on the syndrome measurements or the decoded information; and terminating execution of the one or more quantum circuits in response to the detection of errors. Such embodiments of the system provide the advantages of improving detection of errors for quantum error correction.

In some embodiments of the aforementioned system, the at least one of the computer executable components can further: recalibrate the TLS knob based on the errors; and implement a noise model of the decoder based on the errors. Such embodiments of the system provide the advantage of reducing error rates and stabilizing qubits from TLS defects.

In one or more embodiments of the aforementioned system, the at least one of the computer executable components can further: interleave a test circuit with the quantum circuit; and terminate the execution of the one or more quantum circuits based on outcomes of the test circuit. Such embodiments of the system provide the advantage of reducing error rates and reducing computation costs to achieve target error rates.

In one or more embodiments of the aforementioned system, the at least one of the computer executable components can further: detect a correlated error event from consecutive syndrome measurements; and modulate the TLS knob based on a detection of the correlated error event. Such embodiments of the system provide the advantage of reducing error rates and reducing computation costs to achieve target error rates.

In one or more embodiments of the aforementioned system, the at least one of the computer executable components can further: select a bias point of the qubit-TLS environment based on the errors. Such embodiments of the system provide the advantages of reducing qubit noise and reducing error rates.

According to some embodiments, the above-described computer system can be implemented as a computer-implemented method or as a computer program product.

In quantum computing, qubits are presently imperfect, leading to non-negligible error rates during quantum operations. For practical quantum computing, these errors must be reduced to sufficiently low levels to execute quantum circuits with useful depth and a sufficient number of computational or logical qubits. A commonly proposed approach to address these errors is quantum error correction (QEC). QEC can reduce error rates to arbitrarily small levels, provided certain conditions are met. Reliable operation in quantum computing depends on accurate characterization of qubits to assess their stability and performance to predict and manage error rates more effectively.

QEC typically involves encoding redundant information into the qubits and employing ancillary qubits to detect and correct errors. The overhead associated with QEC, in terms of the number of additional qubits required, depends on various factors such as the desired error rate, the fidelity of qubit gates, the accuracy of decoding algorithms, and the code's distance and threshold.

However, implementing QEC presents significant challenges. For instance, increased physical qubit error rates or invalid decoding assumptions can lead to higher logical qubit error rates, limiting the computational power of the quantum system.

If physical qubit error rates increase, or if decoding assumptions become invalid, the logical qubit error rates can rise, reducing the size of the quantum computation that can be executed without requiring expensive compensations, such as overprovisioning qubits to increase code distance. Additionally, degradation in code properties, such as code distance due to poor-performing qubits, further exacerbates this issue.

Moreover, time-varying gate infidelities complicate the implementation of QEC. For example, superconducting qubit coherence and gate infidelities are subject to time variations due to TLS. These time variations are defects that reside in or nearby the qubits that can cause unpredictable fluctuations and drifts in qubit coherence properties. The fluctuations can lead to increased error rates and potentially compromise the code properties of QEC, making it more difficult to achieve low-overhead error correction. Qubit-TLS interactions are empirically stochastically and exhibit a wide range of spectral densities, causing unpredictable rapid fluctuations and slow drifts in coherence properties. Such time-varying gate infidelities can lead to significant changes in error rates, which may degrade the distance of the QEC code, and thereby compromising quantum error correction. Addressing this challenge complicates the pursuit of low-overhead QEC, as these infidelities can invalidate decoding assumptions, temporarily increase error rates, and degrade code properties if qubit performance declines too much. Thus, an efficient method for reducing error rates in a TLS environment at reduced computational costs can be desirable.

Various embodiments of the present disclosure can be implemented to produce a solution to one or more of the problems discussed above. Embodiments described herein include systems, computer-implemented methods, and computer program products that can enable modulation of a qubit-TLS environment for QEC. For example, in various embodiments, one or more quantum circuits can be executed, wherein the one or more quantum circuits comprise a multiplicity of fault-tolerant operation cycles. Further, a fault-tolerant operation cycle can comprise quantum gates and syndrome measurements. In various embodiments, error information can be obtained from the syndrome measurements or from decoded information from a decoder. In various embodiments, a TLS knob can be modulated to modulate the qubit-TLS environment based on the error information. In particular, the qubit-TLS environment can be modulated during execution of the one or more quantum circuits (e.g., on-line modulation). For example, in various embodiments, modulation of the qubit-TLS environment during execution of the one or more quantum circuits can be performed by modulating the TLS knob with a calibrated time variation. In various instances, the qubit-TLS environment can be modulated after execution of a series of the fault-tolerant operation cycles (e.g., off-line modulation). For example, modulation of the qubit-TLS environment can be modulated after execution of the series of the fault-tolerant operation cycles by post-processing measurement outcomes based on the error information. This can allow the TLS knob to utilize parameters that will cause stability of a qubit.

Figure 5:
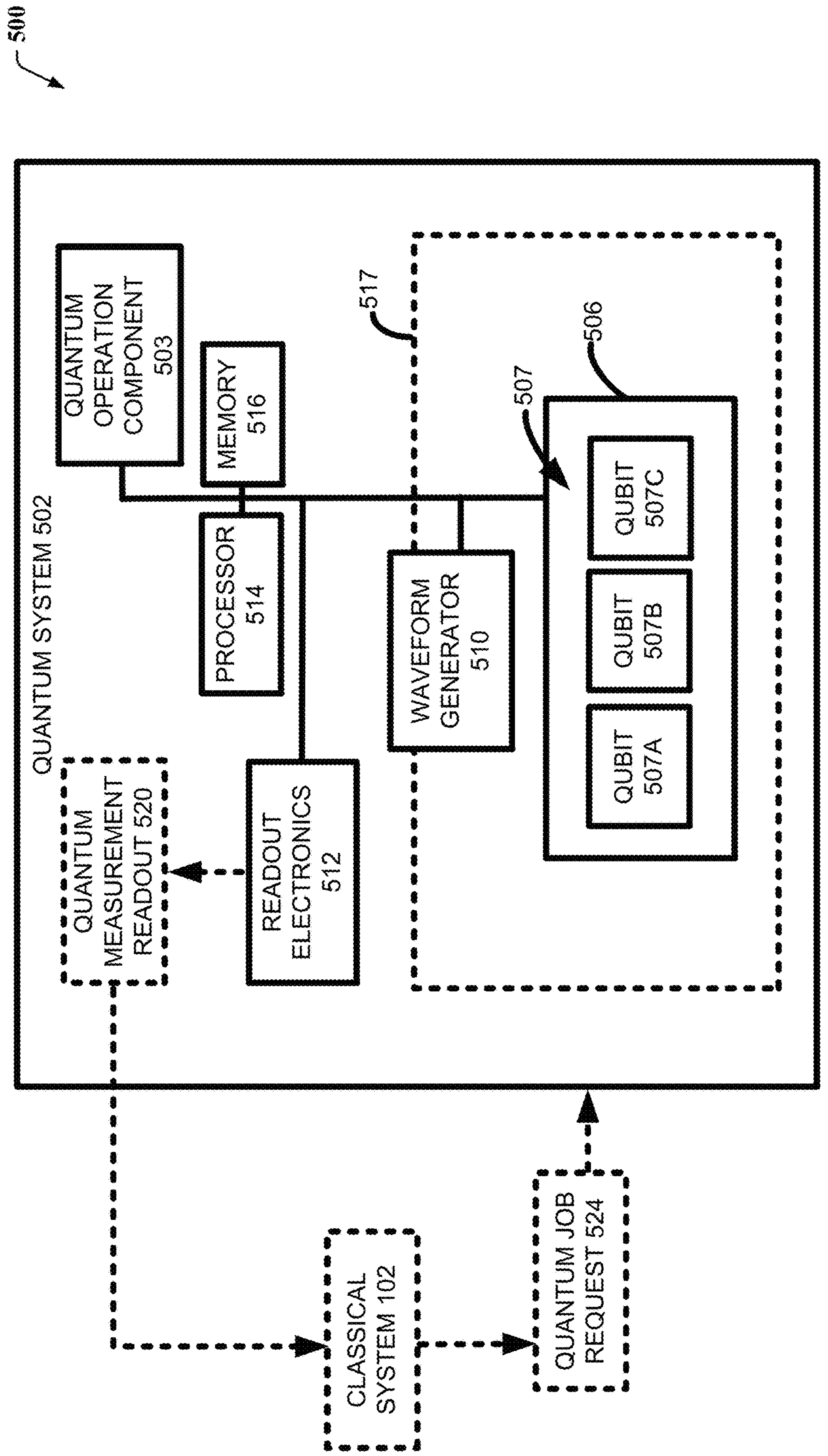
FIG. 5 illustrates a block diagram of an example, non-limiting quantum system that can at least partially facilitate modulation of qubit-TLS environments for quantum error correction in accordance with one or more embodiments described herein.

FIG. 1 illustrates a block diagram of an example, non-limiting system 100 that can facilitate modulation of qubit-TLS environments for quantum error correction in accordance with one or more embodiments described herein. That is, the non-limiting system 100 can facilitate passive modulation of a qubit-TLS interaction landscape, in combination with employment of a quantum system 502 (FIG. 5). Aspects of systems (e.g., TLS modulation for quantum error correction system 102 and the like), apparatuses or processes in various embodiments of the present invention, can constitute one or more machine-executable components embodied within one or more machines (e.g., embodied in one or more computer readable mediums (or media) associated with one or more machines). Such components, when executed by the one or more machines (e.g., computers, computing devices, virtual machines, etc.), can cause the machines to perform the operations described. System 102 can comprise TLS modulation component 101, processor 104, memory 106, system bus 108, execution component 110, detection component 112, and modulation component 114.

The system 100 and/or the components of system 100 can be employed to use hardware and/or software to solve problems that are highly technical in nature (e.g., related to quantum computing, quantum error correction, TLS modulation, etc.), that are not abstract and that cannot be performed as a set of mental acts by a human. Further, some of the processes performed may be performed by specialized computers for carrying out defined tasks related to modulating qubit-TLS environments for quantum error correction. The system 100 and/or components of the system can be employed to solve new problems that arise through advancements in technologies mentioned above, quantum computing, and/or the like. The system 100 can provide technical improvements in terms of achieving more stable QEC operations, improving scalability of QEC, and reducing error rates, etc.

Discussion turns briefly to processor 104, memory 106 and bus 108 of system 100. For example, in one or more embodiments, the system 100 can comprise processor 104 (e.g., computer processing unit, microprocessor, classical processor, and/or like processor). In one or more embodiments, a component associated with system 100, as described herein with or without reference to the one or more figures of the one or more embodiments, can comprise one or more computer and/or machine readable, writable and/or executable components and/or instructions that can be executed by processor 104 to enable performance of one or more processes defined by such component(s) and/or instruction(s).

In one or more embodiments, system 100 can comprise a computer-readable memory (e.g., memory 106) that can be operably connected to the processor 104. Memory 106 can store computer-executable instructions that, upon execution by processor 104, can cause processor 104 and/or one or more other components of system 100 (e.g., TLS modulation component 101, execution component 110, detection component 112, and/or modulation component 114) to perform one or more actions. In one or more embodiments, memory 106 can store computer-executable components (e.g., TLS modulation component 101, execution component 110, detection component 112, and/or modulation component 114).

System 100 and/or a component thereof as described herein, can be communicatively, electrically, operatively, optically and/or otherwise coupled to one another via bus 108. Bus 108 can comprise one or more of a memory bus, memory controller, peripheral bus, external bus, local bus, and/or another type of bus that can employ one or more bus architectures. One or more of these examples of bus 108 can be employed. In one or more embodiments, system 100 can be coupled (e.g., communicatively, electrically, operatively, optically and/or like function) to one or more external systems (e.g., a non-illustrated electrical output production system, one or more output targets, an output target controller and/or the like), sources and/or devices (e.g., classical computing devices, communication devices and/or like devices), such as via a network. In one or more embodiments, one or more of the components of system 100 can reside in the cloud, and/or can reside locally in a local computing environment (e.g., at a specified location(s)).

In addition to the processor 104 and/or memory 106 described above, system 100 can comprise one or more computer and/or machine readable, writable and/or executable components and/or instructions that, when executed by processor 104, can enable performance of one or more operations defined by such component(s) and/or instruction (s).

In various embodiments, system 100 can access a quantum circuit 116, and execution component 110 can execute the quantum circuit 116 on a quantum processor (e.g. processor 514). In various aspects, quantum circuit 116 can comprise any suitable number of qubits, wherein the qubits can be superconducting qubits. Superconducting qubits are a basic and fundamental element of superconducting quantum computers or superconducting quantum systems. In various cases, the qubits can be physically instantiated in any suitable way. For example, the qubits can be realized as an anharmonic electrical resonator (e.g., a resonant circuit that deviates from ideal harmonic behavior and exhibits non-linear relationships between frequency and energy levels). In various embodiments, the qubits can be implemented using TLSs (e.g., quantum system with two distinguishable energy levels that can represent computations basis states of a qubit). Transitions between the two basis states can often be induced by external factors such as electromagnetic radiation, temperature changes, or interactions within the quantum system.

In various aspects, it can be desirable to execute the quantum circuit 116 with quantum error correction. In various embodiments, execution component 110 can repeat execution of quantum circuit 116 any suitable number of times (e.g., 1000 repetitions or shots) to obtain measurements of a qubit of the quantum circuit 116. As a non-limiting example, it can be desirable to measure the energy relaxation time (e.g., decoherence time) of a qubit, denoted by T1. The energy relaxation time of a qubit is a basic coherence characterization of a qubit, representing a timescale over which the qubit's quantum state remains coherent before losing phase relationship due to interactions with its environment. In various aspects, quantum circuit 116 can comprise a multiplicity of fault tolerant operation cycles. Furthermore, the multiplicity of fault tolerant operation cycles can comprise quantum gates and syndrome measurements. In various embodiments, a syndrome measurement can be obtained for each fault tolerant operation cycle in quantum circuit 116.

In various cases, there can be more than one of quantum circuit 116. Accordingly, execution component 110 can execute more than one of quantum circuit 116.

In various embodiments, as described herein, detection component 112 can obtain error information from the syndrome measurements or decoded information from a decoder that is pre-calibrated. A pre-calibrated decoder is a decoder that has been trained or configured to detect and/or correct particular errors prior to execution. Based on the error information, the detection component 112 can detect errors during execution of the quantum circuit 116. Furthermore, based on the error information, the detection component 112 can detect errors after execution of the quantum circuit 116.

In various embodiments, as described herein, modulation component 114 can modulate, based on the error information and via modulation of a TLS knob, a qubit-TLS environment during execution of the quantum circuit 116 or after execution of a series of the fault-tolerant operation cycles in response to a detection of errors. In various aspects, modulating the qubit-TLS environment during execution of the quantum circuit can comprise modulating the TLS knob with a calibrated time variation. Thus, modulation component 114 can modulate the qubit-TLS environment for QEC without executing measurements of data qubits. In various instances, modulating the qubit-TLS environment after execution of the series of fault-tolerant operation cycles can comprise post-processing measurement outcomes based on the error information. Post-processing measurement outcomes can, in some cases, involve selecting shots or batches of shots of execution of the quantum circuit 116 to discard based on the error information. Therefore, the modulation component 114 can recalibrate the TLS knob and modify a noise model of the decoder (e.g., recalibrate the decoder) for subsequent shots or batches of shots of the quantum circuit 116 to reduce error rates.

Figure 2:
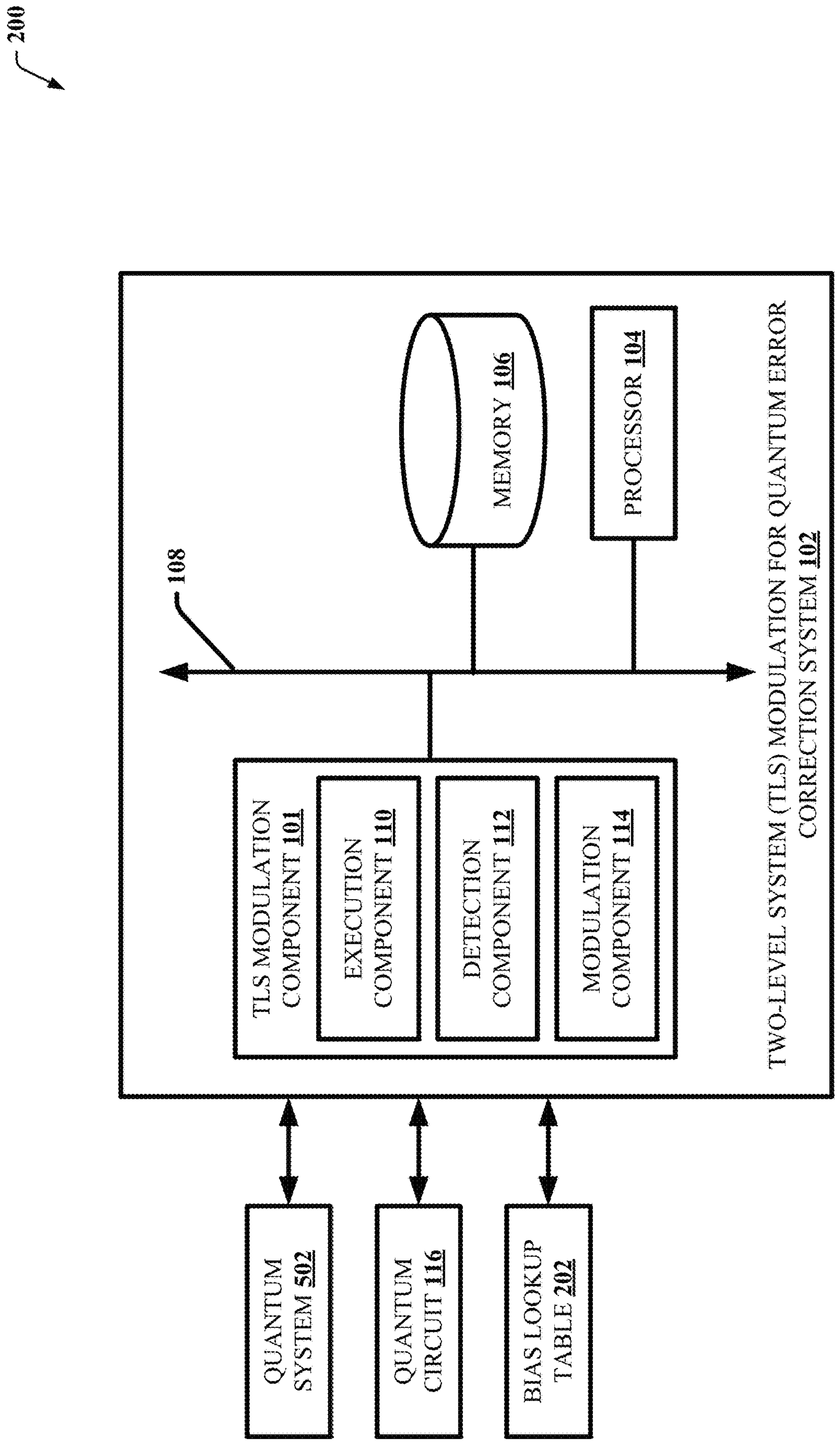
FIG. 2 illustrates a block diagram of an example, non-limiting system including a bias lookup table that can facilitate modulation of qubit-TLS environments for quantum error correction in accordance with one or more embodiments described herein.

FIG. 2 illustrates a block diagram of an example, non-limiting system 200 including a bias lookup table that can facilitate modulation of qubit-TLS environments for quantum error correction in accordance with one or more embodiments described herein. As shown, non-limiting system 200 can, in some cases, comprise the same components as non-limiting system 100 can further comprise a bias lookup table 202.

In various aspects, detection component 112 can electronically access the bias lookup table 202. In various embodiments, as described herein, the bias lookup table 202 can record or store bias ranges of the qubit-TLS environment and its corresponding performance. For instance, the bias lookup table 202 can store rankings of the bias ranges.

In various cases, the bias lookup table 202 can be dynamically updated during execution of the quantum circuit 116 to flag bias ranges (e.g., flag as having significant TLS defects) or alter the rankings of the bias ranges.

In various embodiments, as described herein, detection component 112 can select a bias point of the qubit-TLS environment based on the errors detected. More specifically, detection component 112 can access the bias lookup table 202 to determine which bias point to select. For example, detection component 112 can access the bias lookup table 202 and determine the bias point based on the rankings of the bias ranges.

Figure 3:
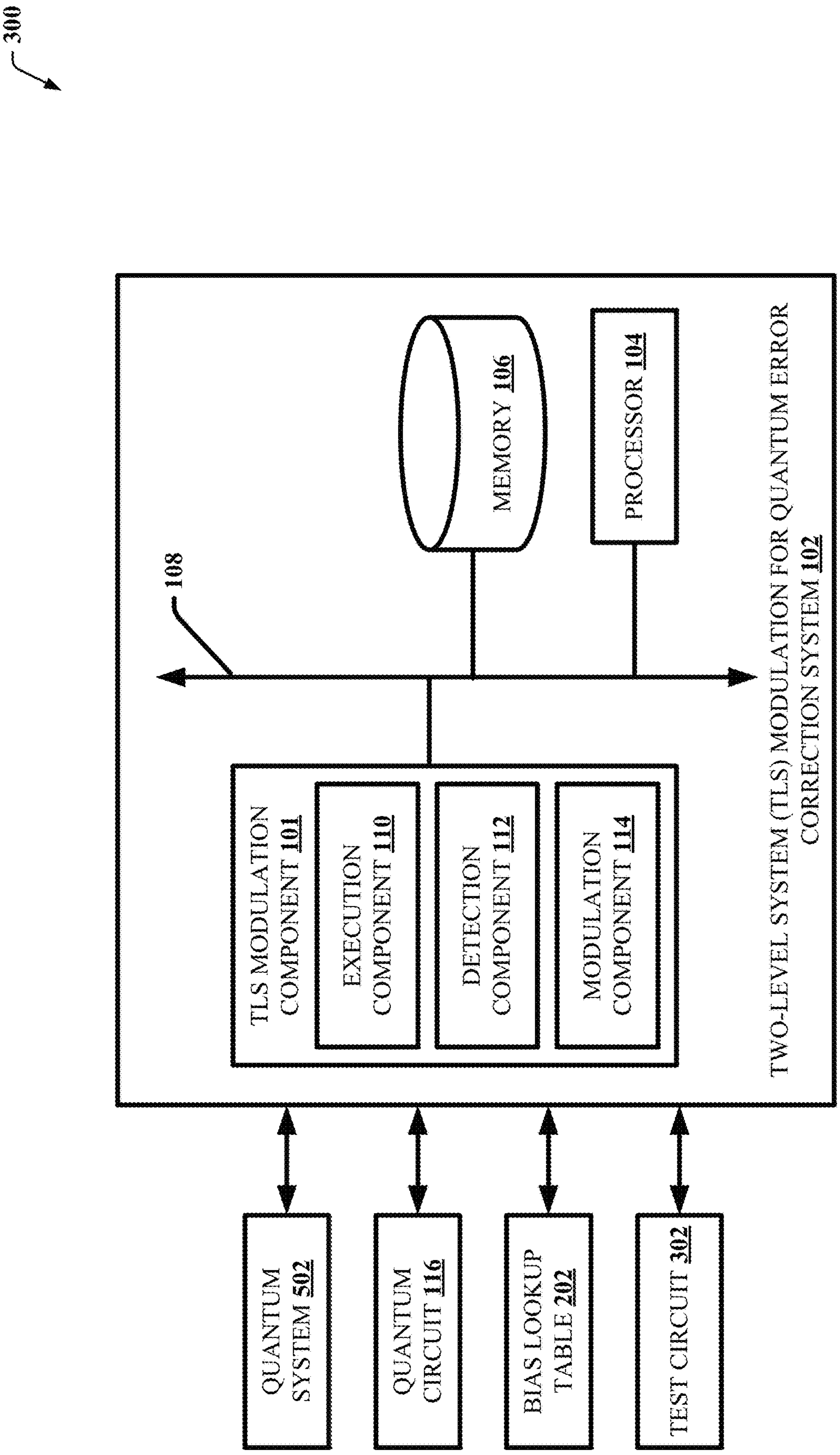
FIG. 3 illustrates a block diagram of an example, non-limiting system including a test circuit that can facilitate modulation of qubit-TLS environments for quantum error correction in accordance with one or more embodiments described herein.

FIG. 3 illustrates a block diagram of an example, non-limiting system 300 including a test circuit that can facilitate modulation of qubit-TLS environments for quantum error correction in accordance with one or more embodiments described herein. As shown, non-limiting system 300 can, in some cases, comprise the same components as non-limiting system 200 can further comprise a test circuit 302.

In various embodiments, as described herein, modulation component 114 can interleave the test circuit 302 with the quantum circuit 116. In various aspects, interleaving quantum circuits can comprise executing, for each shot, a first circuit followed by execution of a second circuit. That is, execution component 110 can execute the quantum circuit 116 and then execute the test circuit 302 for each shot (e.g., for each experiment).

In various instances, the test circuit 302 can be a quantum circuit that can enable efficient detection of errors. Thus, by executing the test circuit 302 with the quantum circuit 116, outcomes such as error information can be obtained from the test circuit 302 and the quantum circuit 116, allowing for more efficient error detection.

Figure 4:
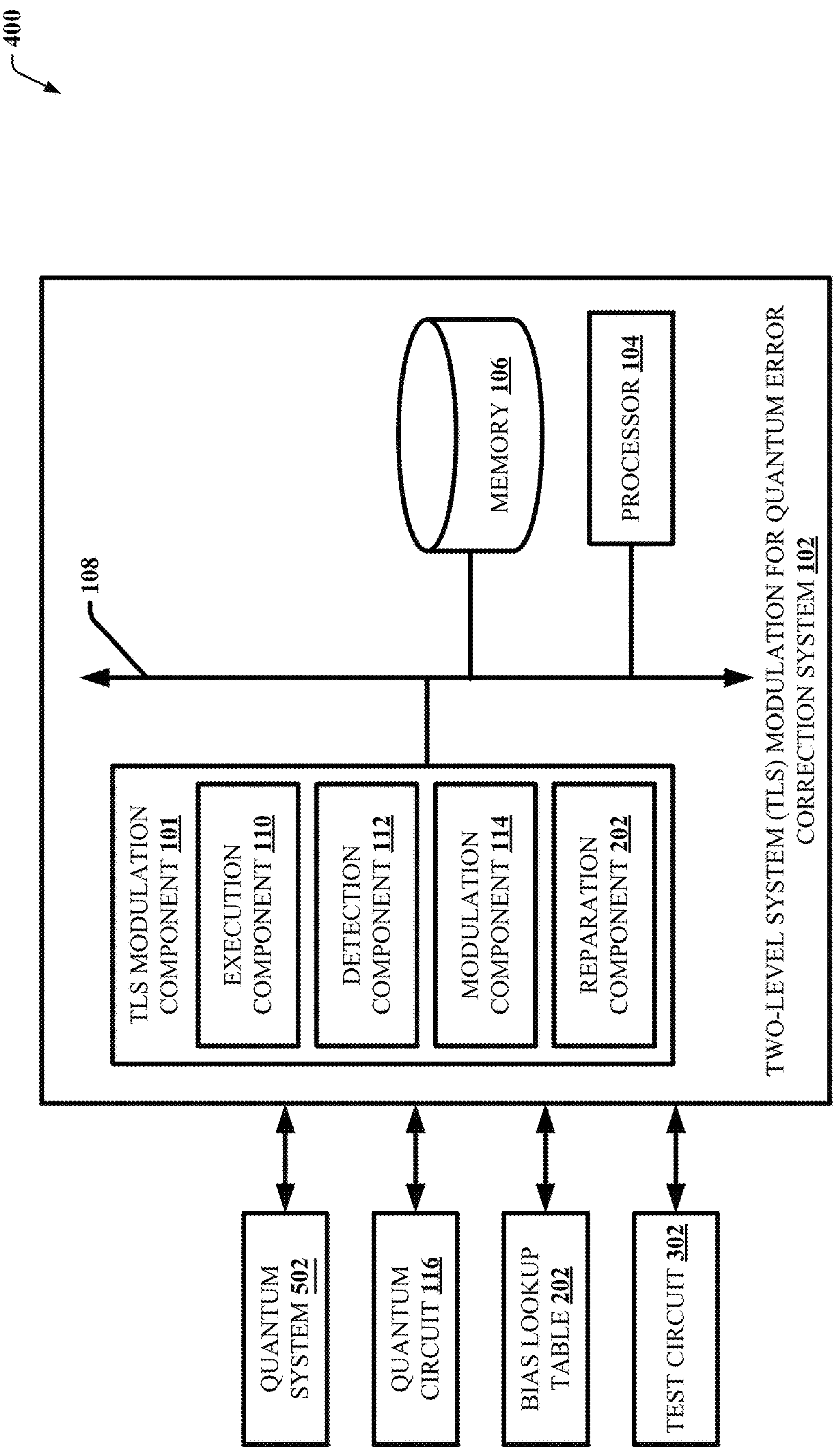
FIG. 4 illustrates a block diagram of an example, non-limiting system including a reparation component that can facilitate modulation of qubit-TLS environments for quantum error correction in accordance with one or more embodiments described herein.

FIG. 4 illustrates a block diagram of an example, non-limiting system 300 including a reparation component that can facilitate modulation of qubit-TLS environments for quantum error correction in accordance with one or more embodiments described herein. As shown, non-limiting system 200 can, in some cases, comprise the same components as non-limiting system 100 can further comprise a reparation component 402.

In various embodiments, as described herein, reparation component 402 can repair a qubit or the quantum gates in response to a detection of errors. For instance, if errors are detected that cannot be corrected during execution of the quantum circuit 116 by modulating the qubit-TLS environment, the reparation component 402 can repair the qubit or the quantum gates by choosing a set of parameters based on prior measurements before the execution of the quantum circuit 116. In various aspects, the set of parameters can define the qubit-TLS environment (e.g., TLS knob values). The set of parameters can be optimized based on the prior measurements before execution of quantum circuit 116. Furthermore, reparation component 402 can repair the qubit or the quantum gates by applying code deformation to error correction code. Applying code deformation can exclude inoperable qubits or inoperable quantum gates from the error correction code, thereby avoiding locations with significant errors.

In other instances, reparation component 402 can repair, in response to a detection of errors, the qubit or the quantum gates by swapping the qubit or the quantum gates with an error-free qubit tile (e.g., an encoded logical qubit across multiple physical qubits). Thus, reparation component 402 can correct the errors of the qubit or the quantum gates. Accordingly, reparation component 402 can swap the error-free qubit tile with the qubit or the quantum gates in response to correcting the errors of the qubit or the quantum gates. In other words, the reparation component 402 can characterize the errors, correct the errors, and swap back the qubit or the quantum gates.

Turning to FIG. 5, one or more embodiments described herein can include one or more devices, systems and/or apparatuses that can provide a process to facilitate passive modulation of the TLS landscape. Accordingly, at FIG. 5, illustrated is a block diagram of an example, non-limiting system 300 that can at least partially facilitate such a process. While referring here to one or more processes, facilitations and/or uses of the non-limiting system 500, description provided herein, both above and below, also can be relevant to one or more other non-limiting systems described herein, such as the non-limiting systems 100.

As illustrated at FIG. 5, the non-limiting system 500 can comprise a quantum system 502 that can be employed with or separate from the classical system 102.

Generally, the quantum system 502 (e.g., quantum computer system, superconducting quantum computer system and/or the like) can employ quantum algorithms and/or quantum circuitry, including computing components and/or devices, to perform quantum operations and/or functions on input data to produce results that can be output to an entity. The quantum circuitry can comprise quantum bits (qubits), such as multi-bit qubits, physical circuit level components, high level components and/or functions. The quantum circuitry can comprise physical pulses that can be structured (e.g., arranged and/or designed) to perform desired quantum functions and/or computations on data (e.g., input data and/or intermediate data derived from input data) to produce one or more quantum results as an output. The quantum results, e.g., quantum measurement readout 520, can be responsive to the quantum job request 524 and associated input data and can be based at least in part on the input data, quantum functions and/or quantum computations.

In one or more embodiments, the quantum system 502 can comprise components, such as a quantum operation component 503, a quantum processor 506, pulse component 510 (e.g., a waveform generator) and/or a readout electronics 520 (e.g., readout component). In one or more other embodiments, the readout electronics 520 can be comprised at least partially by the classical system 102 and/or be external to the quantum system 502. The quantum processor 506 can comprise one or more, such as plural, qubits 507. Individual qubits 507A, 507B and 507C, for example, can be fixed frequency and/or single junction qubits, such as transmon qubits.

In one or more embodiments, a memory 516 and/or processor 514 can be associated with the quantum operation component 503, where suitable. The processor 514 can be any suitable processor. The processor 514 can generate one or more instructions for controlling the one or more processes of the quantum operation component 503.

The quantum operation component 503 can obtain (e.g., download, receive, search for and/or the like) a quantum job request 524 requesting execution of one or more quantum programs and/or a physical qubit layout. The quantum job request 524 can be provided in any suitable format, such as a text format, binary format and/or another suitable format. In one or more embodiments, the quantum job request 524 can be obtained by a component other than of the quantum system 502, such as a by a component of the classical system 102.

The quantum operation component 503 can determine mapping of one or more quantum logic circuits for executing a quantum program. In one or more embodiments, the quantum operation component 503 and/or quantum processor 506 can direct the waveform generator 510 to generate one or more pulses, tones, waveforms and/or the like to affect one or more qubits 507, such as in response to a quantum job request 524.

The waveform generator 510 can generally cause the quantum processor 506 to perform one or more quantum processes, calculations and/or measurements by creating a suitable electro-magnetic signal. For example, the waveform generator 510 can operate one or more qubit effectors, such as qubit oscillators, harmonic oscillators, pulse generators and/or the like to cause one or more pulses to stimulate and/or manipulate the state(s) of the one or more qubits 507 comprised by the quantum system 502.

The quantum processor 506 and a portion or all of the waveform generator 510 can be contained in a cryogenic environment, such as generated by a cryogenic environment 517, such as effected by a dilution refrigerator. Indeed, a signal can be generated by the waveform generator 510 to affect one or more of the plurality of qubits 507. Where the plurality of qubits 507 are superconducting qubits, cryogenic temperatures, such as about 4K or lower, can be employed for function of these physical qubits. Accordingly, one or more elements of the readout electronics 520 also can be constructed to perform at such cryogenic temperatures.

The readout electronics 520, or at least a portion thereof, can be contained in the cryogenic environment 517, such as for reading a state, frequency and/or other characteristic of qubit, excited, decaying or otherwise.

It is noted that the aforementioned description(s) refer(s) to the operation of a single set of instructions run on a single qubit. However, scaling can be achieved. For example, instructions can be calculated, transmitted, employed and/or otherwise used relative to one or more qubits (e.g., non-neighbor qubits) in parallel with one another, one or more quantum circuits in parallel with one another, and/or one or more qubit mappings in parallel with one another.

Figure 6:
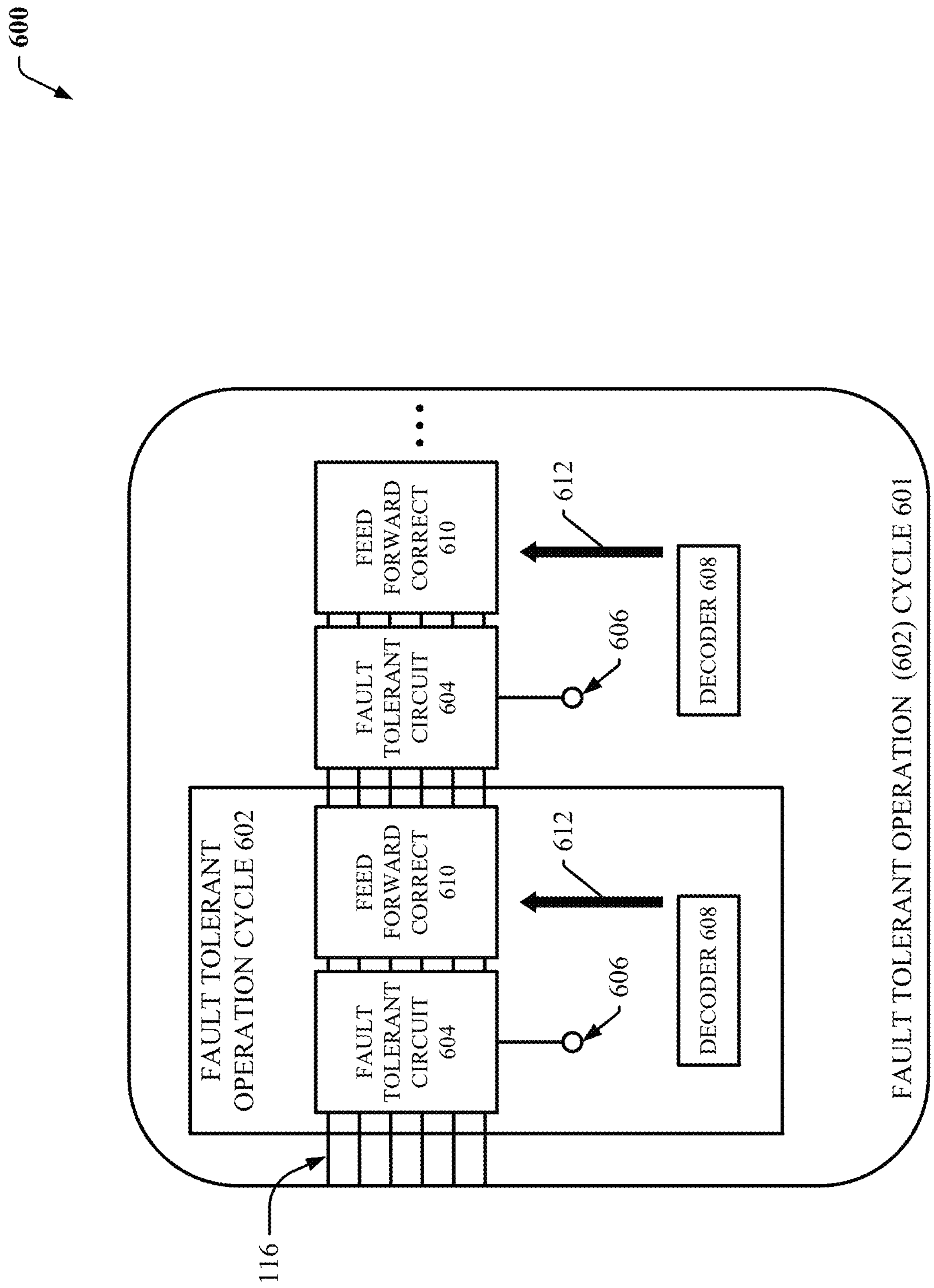
FIG. 6 illustrates a diagram of example, non-limiting fault-tolerant operation cycle in a quantum circuit in accordance with one or more embodiments described herein.

FIG. 6 illustrates a diagram of example, non-limiting fault-tolerant operation cycle 600 in a quantum circuit in accordance with one or more embodiments described herein.

In various embodiments, quantum circuit 116 can comprise fault tolerant operation cycles 602. In various instances, quantum circuit 116 can comprise any suitable number of fault tolerant operation cycles 602. For example, the number of fault tolerant operation cycles 602 can depend on the application of QEC (e.g., thousands of fault tolerant operation cycles for small-scale quantum circuits, millions of fault tolerant operation cycles for large-scale quantum circuits). In various instances, the fault tolerant operation cycles 602 can comprise n operation cycles, for any suitable positive integer n>1: a fault tolerant operation cycle 602(1) to a fault tolerant operation cycle 602(*n*).

In any case, each of the fault tolerant operation cycles 602 can comprise a fault tolerant circuit 604. In various aspects, the fault tolerant circuit 604 can comprise quantum gates, and in particular, fault-tolerant quantum gates. Furthermore, the fault tolerant circuit 604 can comprise syndrome measurements 606. Thus, the fault tolerant operation cycles 602 can obtain syndrome history from the fault tolerant circuit 604.

In various embodiments, a decoder 608 can receive the syndrome measurements 606. Accordingly, the decoder 608 can translate the syndrome measurements 606 into decoded information 612. For instance, the decoded information 612 can indicate types of errors. As another example, the decoded information 612 can indicate locations of errors. In other instances, the decoder 608 can generate error correction operations based on the decoded information 612.

In various embodiments, the fault tolerant operation cycles 602 can comprise a feed forward correct 610. A feed forward correct uses syndrome history of a quantum circuit to influence or modify subsequent operations of the quantum circuit in real time. In various embodiments, the feed forward correct 610 can receive decoded information 612 (e.g., and error correction operations) from the decoder 608 and apply the error correction operations to the quantum circuit 116. In various aspects, a multitude of the fault tolerant operation cycles 602 can be executed in the quantum circuit 116 for error correction. Thus, coherence of the logical qubits can be maintained by dynamically adjusting their states according to detected errors.

Figure 7:
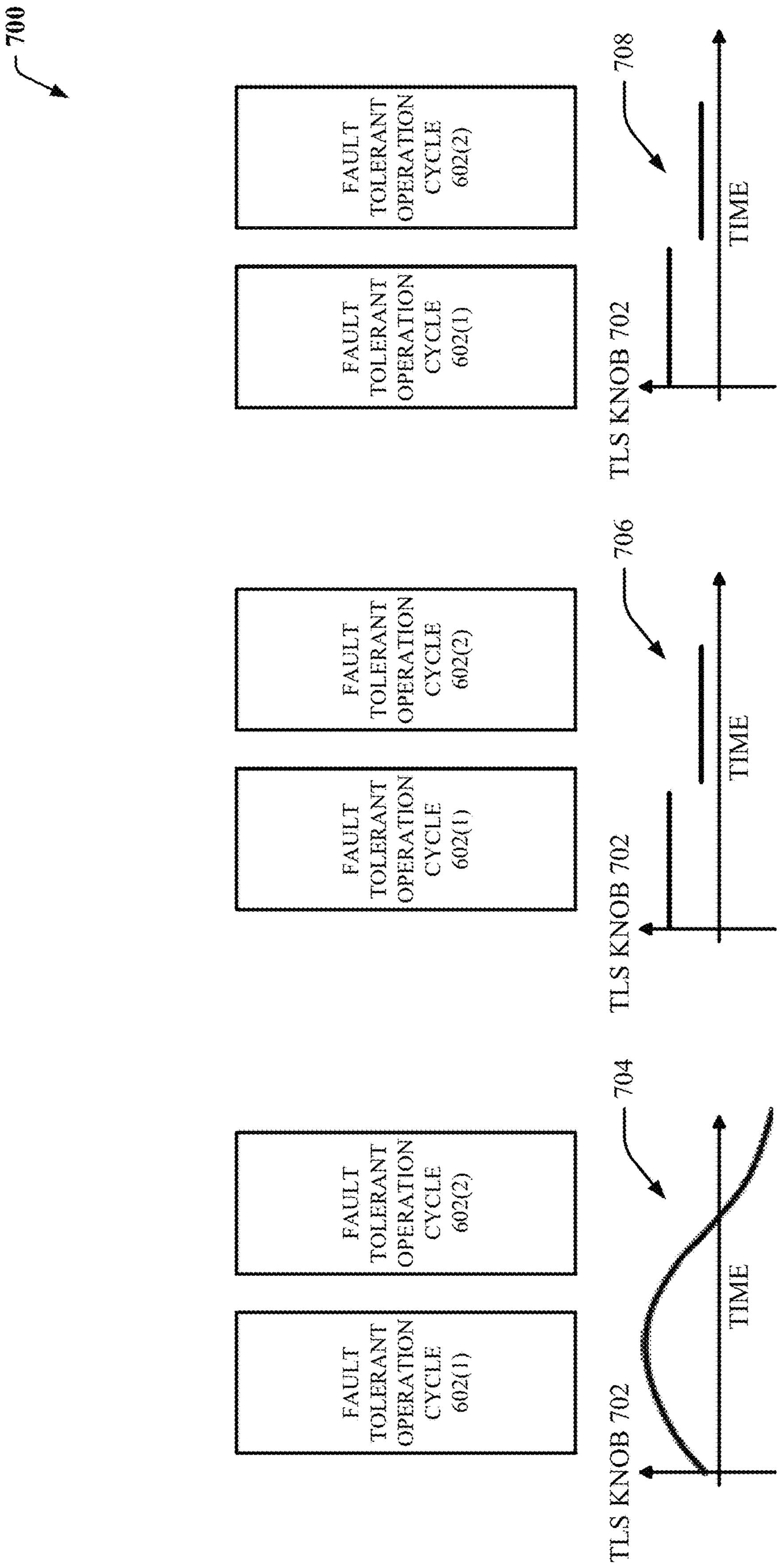
FIG. 7 illustrates an example, non-limiting diagram showing modulation of the TLS environment over fault-tolerant operation cycles in a quantum circuit in accordance with one or more embodiments described herein.

FIG. 7 illustrates an example, non-limiting diagram 700 showing modulation of the TLS environment over fault-tolerant operation cycles in a quantum circuit in accordance with one or more embodiments described herein.

In various embodiments, during execution of the quantum circuit 116, the modulation component 114 can modulate a TLS knob 702. In particular, the modulation component 114 can modulate the TLS knob 702 during execution of the fault tolerant operation cycles 602. For instance, modulation component 114 can modulate the TLS knob 702 during each fault tolerant operation cycle of the fault tolerant operation cycles 602. In various cases, the modulation component 114 can modulate the TLS knob 702 using various methods.

As a non-limiting example, as shown in graph 704, the modulation component 114 can modulate the TLS knob 702 by supplying a continuous modulation that periodically varies to the TLS knob 702, where the modulation operates at a slower rate than the fault tolerant operation cycles 602. In other words, the modulation supplied the TLS knob 702 can slowly vary throughout execution in comparison to the fault tolerant operation cycles 602. Therefore, the qubit experiences different TLS environments.

As another non-limiting example, as shown in graph 706, the modulation component 114 can modulate the TLS knob 702 by supplying varying TLS knob values for each measurement event. That is, during syndrome measurements 606, the modulation component 114 can switch the TLS knob 702 to a different TLS knob value. Therefore, the qubit experiences different TLS environments during the fault tolerant operation cycles 602. For instance, modulation component 114 can supply the TLS knob 702 with a first TLS knob value during the fault tolerant operation cycle 602(1). During the syndrome measurement of the fault tolerant operation cycle 602(1), the modulation component 114 can switch the TLS knob 702 to a second TLS knob value until the syndrome measurement of the fault tolerant operation cycle 602(2).

As still another non-limiting example, as shown in graph 708, the modulation component 114 can modulate the TLS knob 702 by supplying varying TLS knob values for each of the fault tolerant operation cycles 602. That is, after execution of each of the fault tolerant operation cycles 602, the modulation component 114 can switch the TLS knob 702 to a different TLS knob value. Therefore, a subsequent fault tolerant operation cycle will have a different qubit-TLS interaction environment, thereby providing a different TLS environment to the qubit. For instance, modulation component 114 can supply the TLS knob 702 with a first TLS knob value during the fault tolerant operation cycle 602(1). After execution of the fault tolerant operation cycle 602(1), the modulation component 114 can switch the TLS knob 702 to a second TLS knob value for the duration of the fault tolerant operation cycle 602(2).

In various embodiments, modulation component 114 can calibrate the TLS knob 702 with a time variation to supply the modulation using such various modulation methods. No matter the modulation method used, modulation component 114 can modulate the TLS knob 702 to provide different TLS environments to the qubit. Thus, the modulation component 114 can provide, on average, a more suitable TLS environment to the qubit, thereby stabilizing the qubit.

In other words, by modulating the qubit-TLS interaction environment via modulation of the TLS knob 702 with a calibrated time variation, variance in error rates of the qubit can be reduced, thereby mitigating outlier events (e.g., unlikely or unexpected occurrences that deviate significantly from typical error patterns) or hard decoding cases (e.g., instances where a decoder is unable to accurately identify and correct errors based on the syndrome measurements due to complex error patterns or high error rates).

In various embodiments, modulation component 114 can modulate more than one qubit-TLS interaction environments independently via more than one respective TLS knobs to stabilize more than one qubit. That is, the methods described herein can be extended to multi-qubit scenarios.

Figure 8:
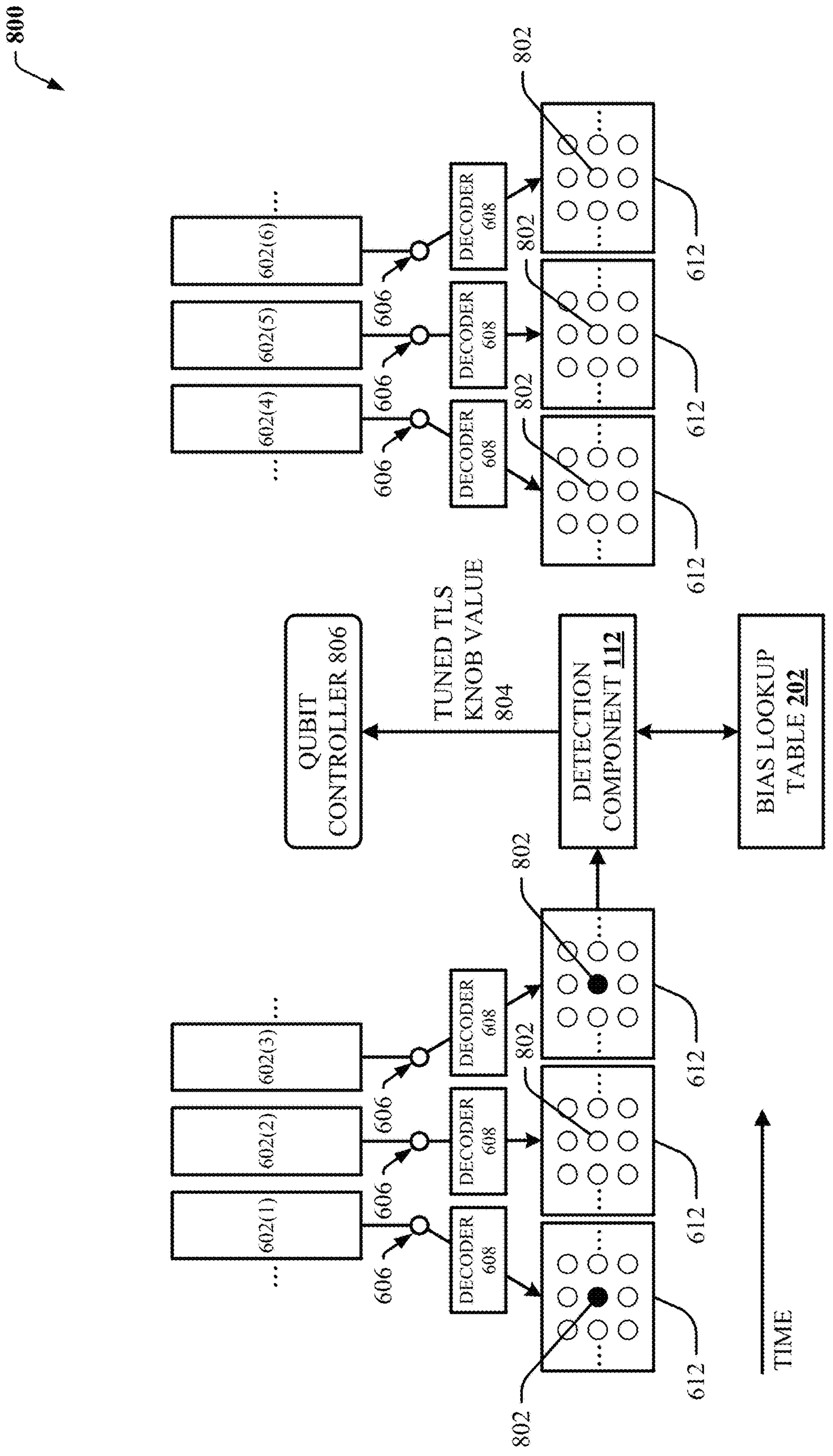
FIG. 8 illustrates an example, non-limiting diagram showing detection of a correlated error event for modulation of the TLS environment in accordance with one or more embodiments described herein.

FIG. 8 illustrates an example, non-limiting diagram 800 showing detection of a correlated error event for modulation of the TLS environment in accordance with one or more embodiments described herein.

In various embodiments, execution component 110 can execute quantum circuit 116. Accordingly, one or more of the fault tolerant operation cycles 602 can generate syndrome measurements 606, where the decoder 608 receives the syndrome measurements 606 to generate decoded information 612. In various aspects, detection component 112 can receive decoded information 612. Therefore, detection component 112 can detect a correlated error event from syndrome measurements 606 using the decoded information 612.

As a non-limiting example, syndrome measurements 606 can be generated respectively from consecutive fault tolerant operation cycles. For instance, the consecutive fault tolerant operation cycles can comprise fault tolerant operation cycle 602(*n*), fault tolerant operation cycle 602(*n*+1), and fault tolerant operation cycle 602(*n*+2). Furthermore, decoder 608 can generate decoded information 612 from the syndrome measurements 606 generated from fault tolerant operation cycle 602(*n*) that indicates a detection event of a qubit 802. Similarly, decoded information 612 from the syndrome measurements 606 generated from fault tolerant operation cycle 602(*n*+2) can indicate a detection event at qubit 802. Based on the decoded information 612 generated from the consecutive fault tolerant operation cycles (e.g., from consecutive syndrome measurements), detection component 112 can detect a correlated error event.

In various embodiments, detection component 112 can detect the correlated error event using decision logic. For instance, detection component 112 can detect the correlated error event from the consecutive fault tolerant operation cycles based on a threshold of performance. As a non-limiting example, the threshold of performance can define a maximum error rate. In other words, the threshold of performance can define a threshold on a frequency of errors (e.g. a maximum frequency of an error). Therefore, if the number of detection events of a qubit causes the error rate or the frequency of the same error to exceed the threshold of performance (e.g., the same error is detected more frequently than the threshold of performance), detection component 112 can detect the correlated error event. In various instances, the threshold of performance can define a threshold for a defined duration of time. For example, if correlated noise is present for a duration longer than the defined duration of time, the detection component 112 can engage the modulation component 114 to modulate the qubit-TLS interaction environment of the qubit.

In any case, in response to a detection of a correlated error event based on the threshold of performance, detection component 112 can engage the modulation component 114 to modulate the qubit-TLS interaction environment of the qubit. As a non-limiting example, detection component 112 can detect a correlated error event from qubit 802 and thus engage the modulation component 114 to change the TLS knob 702 to a different TLS knob value for qubit 802. In various aspects, detection component 112 can engage modulation component 114 to determine a tuned TLS knob value 804 based on the detected correlated error event. Accordingly, the detection component 112 can input the tuned TLS knob value 804 to a qubit controller 806 to apply the tuned TLS knob value 804 to the qubit 802 via the TLS knob 702. In response to applying the tuned TLS knob value 804, execution of the quantum circuit can continue. That is, subsequent fault tolerant operation cycles in the quantum circuit 116 can be executed and correlated error events can be detected from the subsequent fault tolerant operation cycles.

In various embodiments, detection component 112 can select a bias point based on the correlated error event using the bias lookup table 202. That is, detection component 112 can access the bias lookup table 202 to determine a different bias point if an error is detected based on the threshold of performance (e.g., an error that persists over multiple fault tolerant operation cycles). Various aspects are described with respect to FIG. 9.

FIG. 9 illustrates an example, non-limiting bias lookup table 900 in accordance with one or more embodiments described herein.

In various embodiments, the non-limiting bias lookup table 900 can comprise bias ranges 902. For example, the bias ranges 902 in non-limiting bias lookup table 900 can comprise a range B1-B2, a range B2-B3, a range B3-B4, a range B4-B5, and a range B5-B6. In various instances, the bias ranges 902 can comprise any suitable number of ranges.

In various instances, one or more of the bias ranges 902 can have qubit-TLS interaction that does not exhibit a desired performance. As an example, a bias range can cause the qubit-TLS interaction to increase the error rate. As another example, a bias range can cause excessive coupling between the qubit and the TLS environment, causing noise that reduces the qubit's coherence time. In any instance, the non-limiting bias lookup table 900 can record or store the bias ranges and their corresponding performance. In various embodiments, detection component 112 can initialize the non-limiting bias lookup table 900 using initial TLS measurements. Subsequently, detection component 112 can update the non-limiting bias lookup table 900 during execution of the quantum circuit 116.

In various aspects, detection component 112 can rank the bias ranges 902 in the non-limiting bias lookup table 900. In various instances, detection component 112 can rank the bias ranges 902 by an event 904. For example, the detection component 112 can rank the bias ranges 902 at a start 906 of execution of the quantum circuit 116. As another example, the detection component 112 can rank the bias ranges 902 at a defect detection 908 (e.g., error detected, correlated error event detected). As a non-limiting example, detection component 112 can initially rank the bias ranges 902 at rank '1' (e.g., first). In response to a detection of errors that occur over more than one fault tolerant operation cycle, the detection component 112 can update rankings of the bias ranges 902. That is, based on the errors detected, the detection component 112 can modify the rankings of the bias ranges 902. For instance, detection component 112 can change the ranking of a range 910 (e.g., B1-B2) to rank 912 (e.g., rank '2') based on the errors detected at the range 910. Accordingly, the detection component 112 can select a different bias point based on the rankings of the bias ranges 902.

In some cases, detection component 112 can flag a bias range in the non-limiting bias lookup table 900 based on the errors detected. Specifically, if the bias range exhibits TLS that exceeds a threshold of performance (e.g., persistent bit flip error, severe TLS, error exceeds the threshold of performance), detection component 112 can flag the bias range with a TLS flag 914. As a non-limiting example, the detection component 112 can flag the range 910 (e.g., B1-B2) with the TLS flag 914 to indicate that the range 910 exhibits TLS defects. Therefore, when the detection component 112 accesses the non-limiting bias lookup table 900 to select a different bias point, the detection component 112 can select a bias point in a bias range that is not known to exhibit TLS defects.

Figure 10:
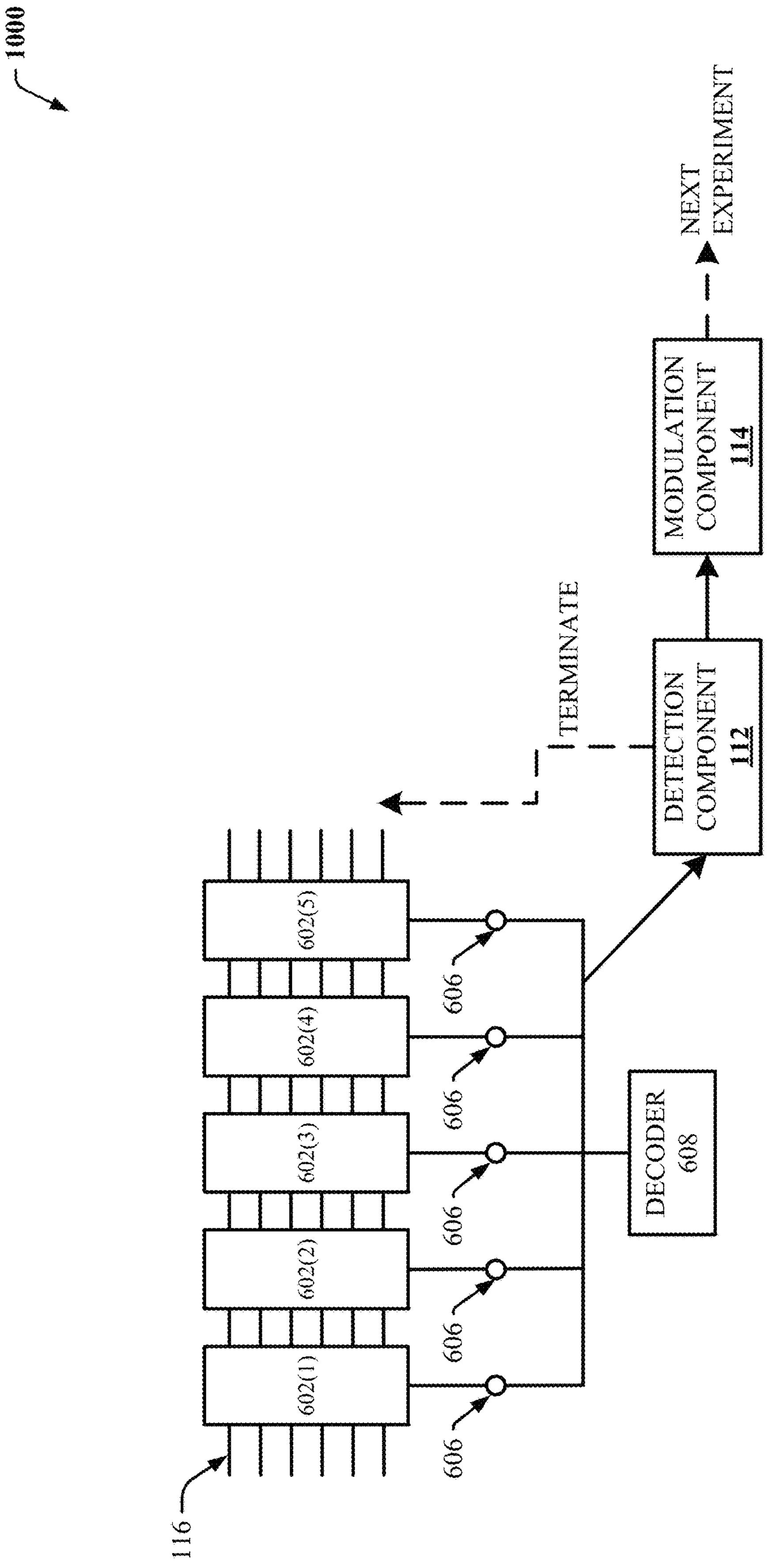
FIG. 10 illustrates an example, non-limiting diagram showing termination execution of the quantum circuit and recalibration of a TLS knob in accordance with one or more embodiments described herein.

FIG. 10 illustrates an example, non-limiting diagram 1000 showing termination execution of the quantum circuit and recalibration of a TLS knob in accordance with one or more embodiments described herein.

In various aspects, the detection component 112 can detect errors based on the syndrome measurements 606 or the decoded information 612. In various embodiments, modulation component 114 can terminate the quantum circuit 116 in response to the detection of errors. In some aspects, terminating quantum circuit 116 can comprise terminating a shot of the quantum circuit 116. In other instances, terminating quantum circuit 116 can comprise terminating a batch of shots (e.g., more than one shot) of the quantum circuit 116. In various aspects, termination of quantum circuit 116 can be executed based on performance conditions.

For example, modulation component 114 can terminate the quantum circuit 116 in response to a detection of a catastrophic error. A catastrophic error is an error that propagates uncontrollably through the quantum system, affecting multiple qubits and leading to the failure of the entire quantum computation. Catastrophic errors are often beyond error correction capabilities to recover. Therefore, modulation component 114 can terminate the quantum circuit 116 to prevent failure of quantum operations.

As another example, modulation component 114 can terminate the quantum circuit 116 in response to a detection of correlated error events (e.g., errors detected from consecutive syndrome measurements).

In any case, if a detection event does not satisfy the performance conditions (e.g., an out-of-compliance event, qubit behavior does not satisfy the performance conditions, error rates exceed the threshold of performance) modulation component 114 can terminate the quantum circuit 116. As a non-limiting example, a particular syndrome measurement can trigger more frequently than an expected amount, where a probability of an ancilla qubit being measured is 0.5. However, under typical error rates, the probability of an ancilla qubit being measured is expected to be 0.05. Therefore, since the probability is greater than the expected probability, modulation component 114 can terminate the quantum circuit 116. Conversely, if a detection event does satisfy the performance conditions or there are no detection events, modulation component 114 can refrain from terminating the quantum circuit 116.

In various embodiments, in response to terminating the quantum circuit 116, the modulation component 114 can recalibrate the TLS knob 702 based on the errors. For example, the modulation component 114 can recalibrate the TLS knob 702 with a different time variation. In some cases, the modulation component 114 can recalibrate the TLS knob 702 by changing the modulation method of the TLS knob 702 (e.g., recalibrate the TLS knob 702 from continuous modulation to varying TLS knob values for each measurement event, recalibrate the TLS knob 702 from varying TLS knob values for each measurement event to varying TLS knob values for each fault tolerant operation cycle). In other cases, the modulation component 114 can recalibrate the TLS knob 702 by changing the TLS knob value of the TLS knob 702.

In various instances, recalibration of the TLS knob 702 can comprise recalibrating the TLS knob 702 for one or more qubits. In various embodiments, the modulation component 114 can determine which qubits should receive a recalibrated TLS knob 702. That is, in each fault tolerant operation cycle, ancilla qubits detect errors propagated through a finite number of data qubits or ancilla qubits, enabling such determination of qubits that should be supplied a recalibrated TLS knob 702.

Furthermore, in various embodiments, the modulation component 114 can implement a different noise model of the decoder 608 than a current noise model of the decoder 608 in response to terminating the quantum circuit 116. More specifically, the modulation component 114 can determine the different noise model based on the errors detected, and accordingly implement the different noise model of the decoder 608.

Accordingly, execution component 110 can execute a next experiment with the recalibrated TLS knob 702 and different noise model of the decoder 608. In some instances, executing the next experiment can comprise executing another shot of the quantum circuit 116. In other instances, executing the next experiment can comprise executing another batch of shots of the quantum circuit 116. In any case, execution component 110 can execute the shot or batch of shots with the recalibrated TLS knob 702 and different noise model of the decoder 608.

Figure 11:
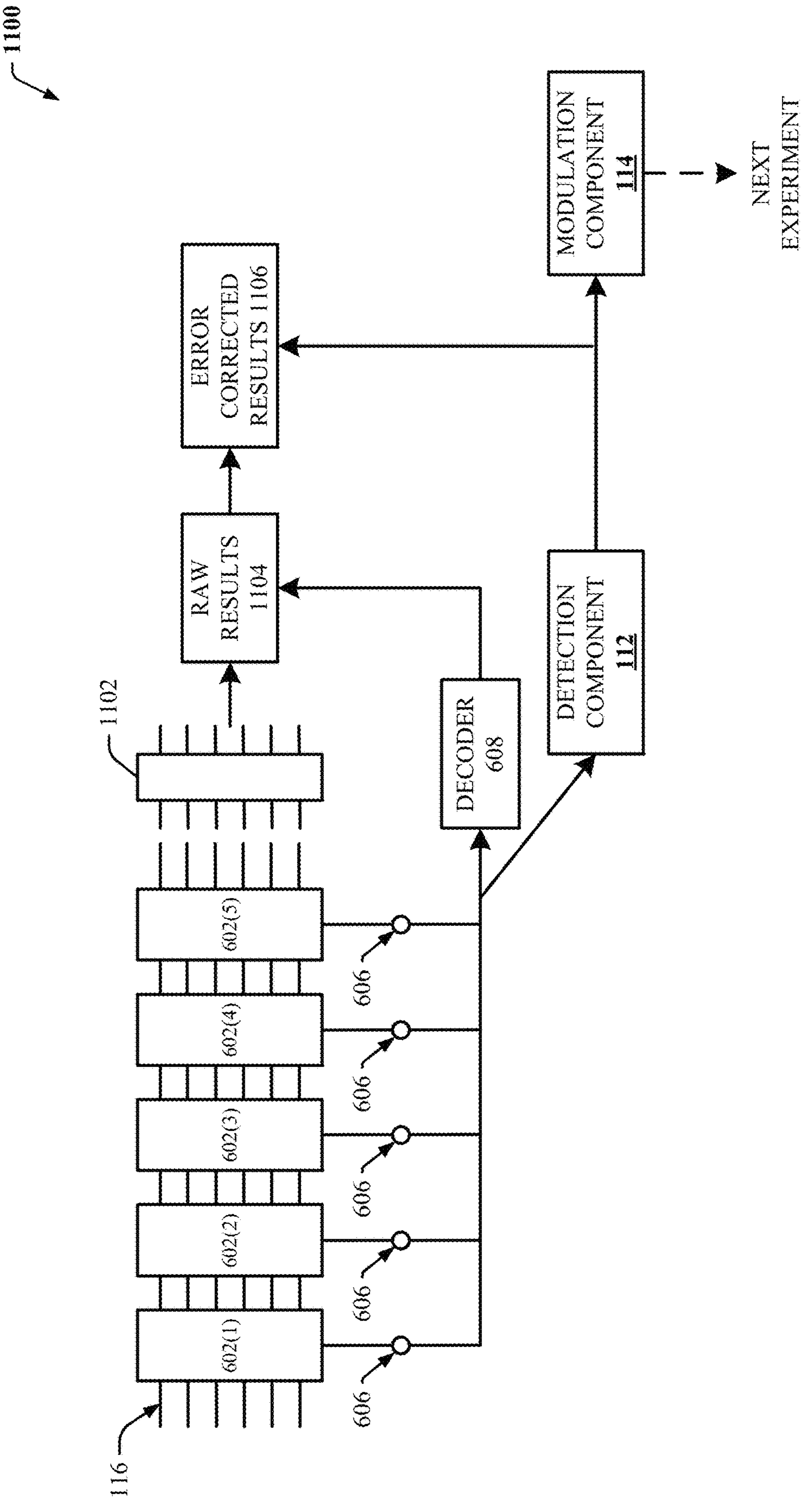
FIG. 11 illustrates an example, non-limiting diagram showing generation of error corrected results and recalibration of a TLS knob in accordance with one or more embodiments described herein.

FIG. 11 illustrates an example, non-limiting diagram 1100 showing generation of error corrected results and recalibration of a TLS knob in accordance with one or more embodiments described herein.

In various aspects, modulation component 114 can terminate the quantum circuit 116 in response to a detection of correlated error events. Following termination of the quantum circuit 116, execution component 110 can perform a measurement 1102 to generate raw results 1104. Furthermore, the decoder 608 can correct the raw results 1104 using the decoded information 612 to generate error corrected results 1106 (e.g., error-corrected states).

In various embodiments, detection component 112 can detect a catastrophic error based on the threshold of performance from the syndrome measurements 606. If a catastrophic error is detected, detection component 112 can flag the error corrected results 1106. Specifically, detection component 112 can flag the error corrected results 1106 to indicate that the error corrected results 1106 may be corrupted. Therefore, an entity can decide to discard the error corrected results 1106 or retain the error corrected results 1106 based on the flag indicating corrupted results. For example, flagging the error corrected results 1106 if a catastrophic error is detected can aid in post-processing measurement outcomes of the quantum circuit 116 (e.g., to determine if a shot or batch of shots is to be discarded).

In any instance, in response to terminating the quantum circuit 116, the modulation component 114 can recalibrate the TLS knob 702 based on the errors. Furthermore, in various embodiments, the modulation component 114 can implement a different noise model of the decoder 608 than the current noise model of the decoder 608 in response to terminating the quantum circuit 116. Accordingly, execution component 110 can execute the next experiment (e.g., another shot of the quantum circuit 116, another batch of shots of the quantum circuit 116) with the recalibrated TLS knob 702 and different noise model of the decoder 608.

Figure 12:
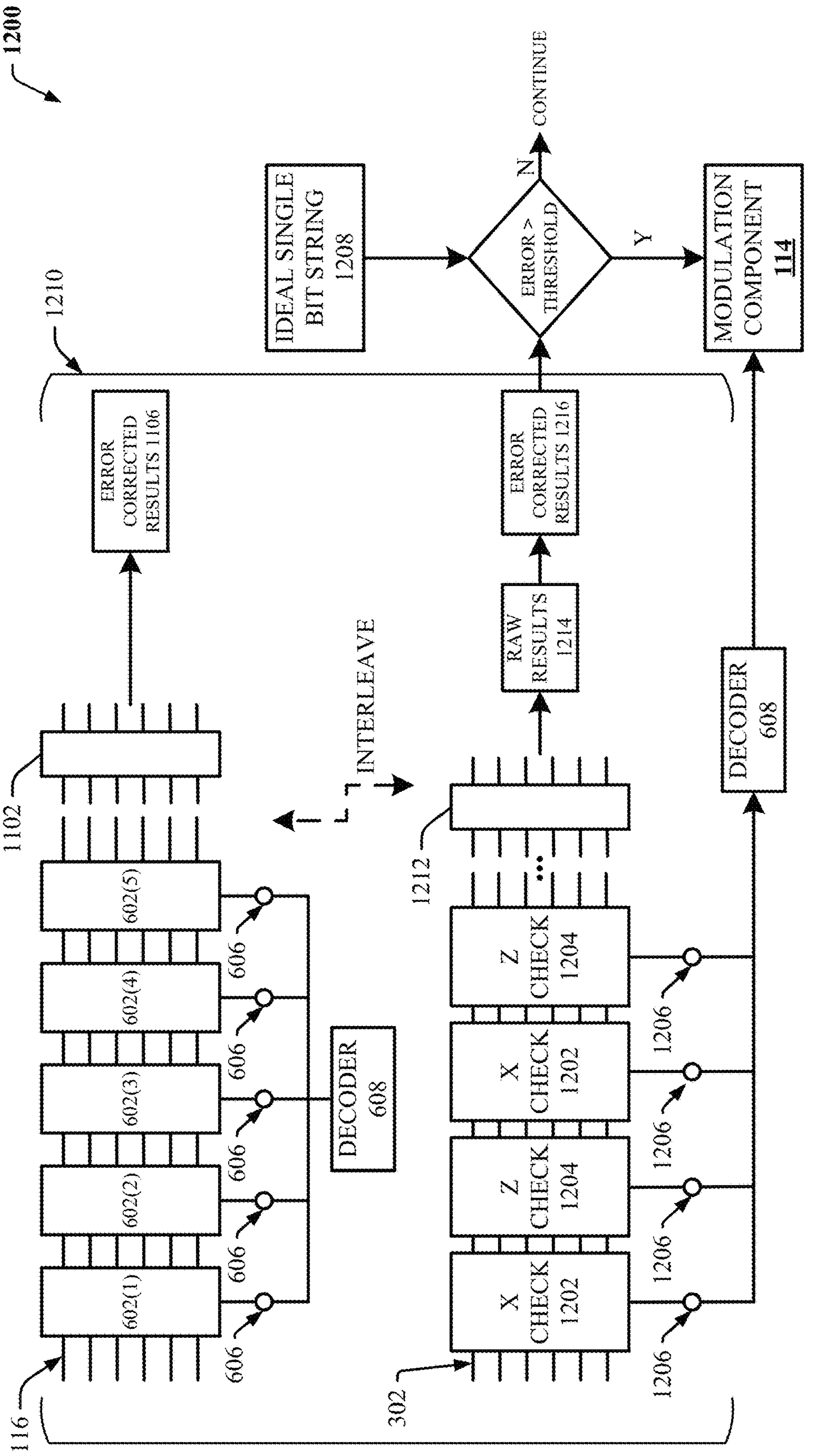
FIG. 12 illustrates an example, non-limiting diagram showing interleaving of a test circuit with the quantum circuit for quantum error detection in accordance with one or more embodiments described herein.

FIG. 12 illustrates an example, non-limiting diagram 1200 showing interleaving of a test circuit with the quantum circuit for quantum error detection in accordance with one or more embodiments described herein.

In various embodiments, modulation component 114 can interleave the test circuit 302 with the quantum circuit 116. In various aspects, the test circuit 302 can be representative of a desired quantum operation that can be easily computed. That is, the test circuit 302 can be formulated such that errors can be efficiently detected. For example, the test circuit 302 should produce a uniform result (e.g., a binary string of all ones) under normal conditions. Therefore, if an error occurs, the test circuit 302 can produce outcomes such as unexpected results (e.g., a binary strings with zeros appearing where ones are expected). As a non-limiting example, the test circuit 302 can comprise one or more X-checks 1202 and one or more Z-checks 1204.

In any instance, the test circuit 302 can comprise syndrome measurements 1206 that can be decoded by decoder 608 to generate decoded information 612. Furthermore, execution component 110 can perform a measurement 1212 to generate raw results 1214. In various aspects, the decoder 608 can correct the raw results 1214 using the decoded information 612 to generate error corrected results 1216. Therefore, error corrected results can be obtained from the quantum circuit 116 and the test circuit 302. In particular, the error corrected results 1216 can be utilized to more efficiently detect errors. In some cases, in response to the detected errors and based on the outcomes of the test circuit 302 (e.g., error corrected results 1216, decoded information 612), modulation component 114 can terminate execution of the quantum circuit 116.

In various embodiments, if the error determined in the error corrected results is larger than the threshold of performance, the modulation component 114 can discard the error corrected results 1106 and error corrected results 1216. Moreover, in various aspects, the modulation component 114 can recalibrate the TLS knob 702 and/or implement a different noise model of the decoder 608 than the current noise model of the decoder 608. Conversely, if the error determined in the error corrected results is not larger than the threshold of performance, the modulation component 114 can refrain from discarding the error corrected results 1106 and error corrected results 1216. Furthermore, modulation component 114 can refrain from recalibrating the TLS knob 702 or implementing the different noise model of the decoder 608.

In various embodiments, execution component 110 can execute interleaved quantum circuits 1210 (e.g., quantum circuit 116 interleaved with test circuit 302) with any suitable desired threshold of performance for any suitable number of repetitions. For instance, the threshold of performance can define an error threshold as $$p_{th} \sim \frac{1}{N_{detect}},$$

where $p_{th}$ denotes the threshold of performance and $N_{detect}$ denotes a number of detection events. Therefore, as the number of detection events increases, the error threshold can be reduced, allowing tolerance of a higher rate of errors while still being able to correct them effectively. In various instances, detection component 112 can receive an ideal single bit string 1208 to determine the error is larger than the threshold of performance.

Figure 13:
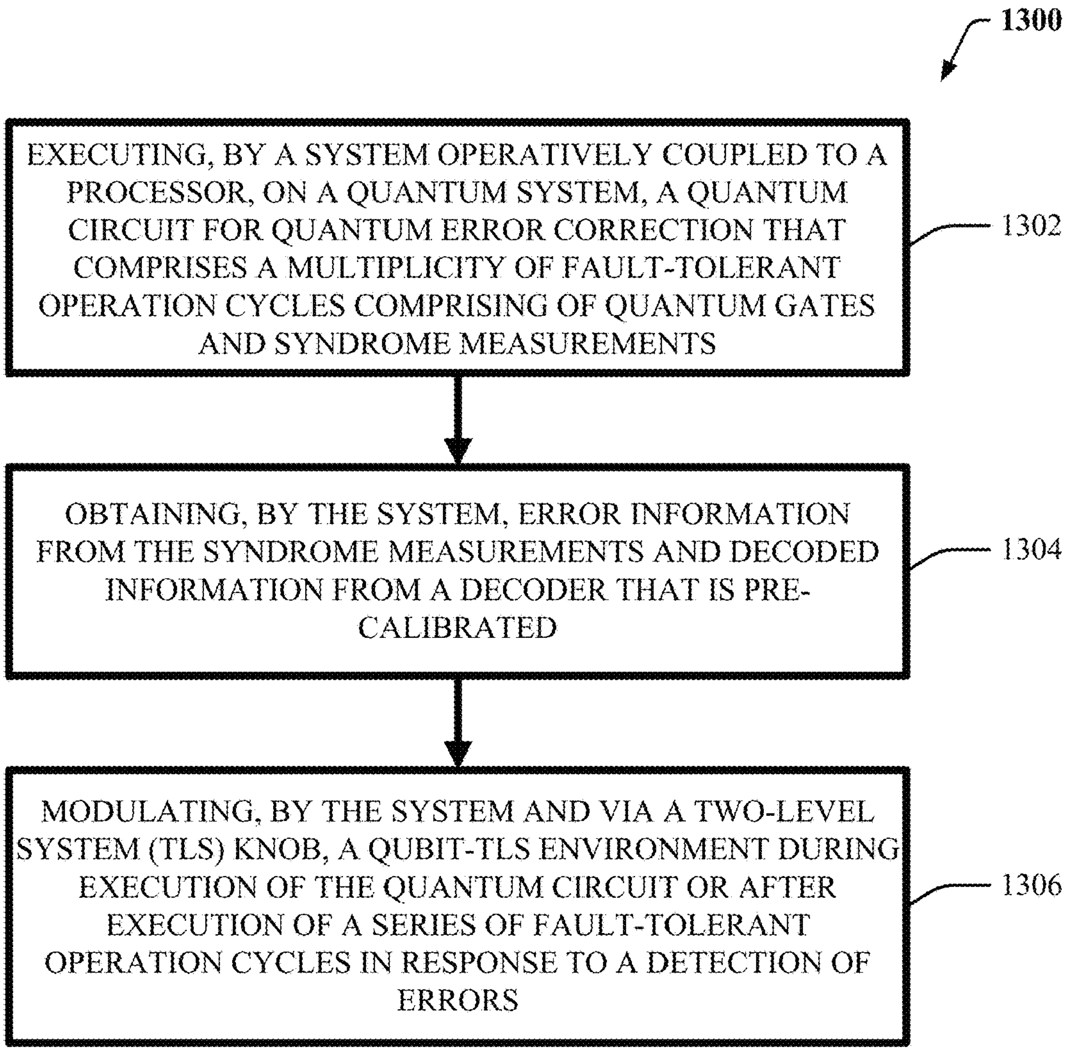
FIG. 13 illustrates a flow diagram of an example, non-limiting method that can facilitate modulation of qubit-TLS environments for quantum error correction in accordance with one or more embodiments described herein.

FIG. 13 illustrates a flow diagram of an example, non-limiting method 1300 that can facilitate modulation of qubit-TLS environments for quantum error correction in accordance with one or more embodiments described herein. Repetitive description of like elements and/or processes employed in respective embodiments is omitted for sake of brevity.

At 1302, the non-limiting method 1300 can comprise executing (e.g., by execution component 110), by a system operatively coupled to processor, a quantum circuit (e.g., 116) for quantum error correction that comprises a multiplicity of fault-tolerant operation cycles (e.g., 602) comprising of quantum gates and syndrome measurements (e.g., 606).

At 1304, the non-limiting method 1300 can comprise obtaining (e.g., by detection component 112), by the system, error information from the syndrome measurements and decoded information (e.g., 612) from a decoder (e.g., 608) that is pre-calibrated.

At 1306, the non-limiting method 1300 can comprise modulating (e.g., by modulation component 114), by the system and via a TLS knob (e.g., 702), a qubit-TLS environment during execution of the quantum circuit or after execution of a series of fault-tolerant operation cycles in response to a detection of errors.

Figure 14:
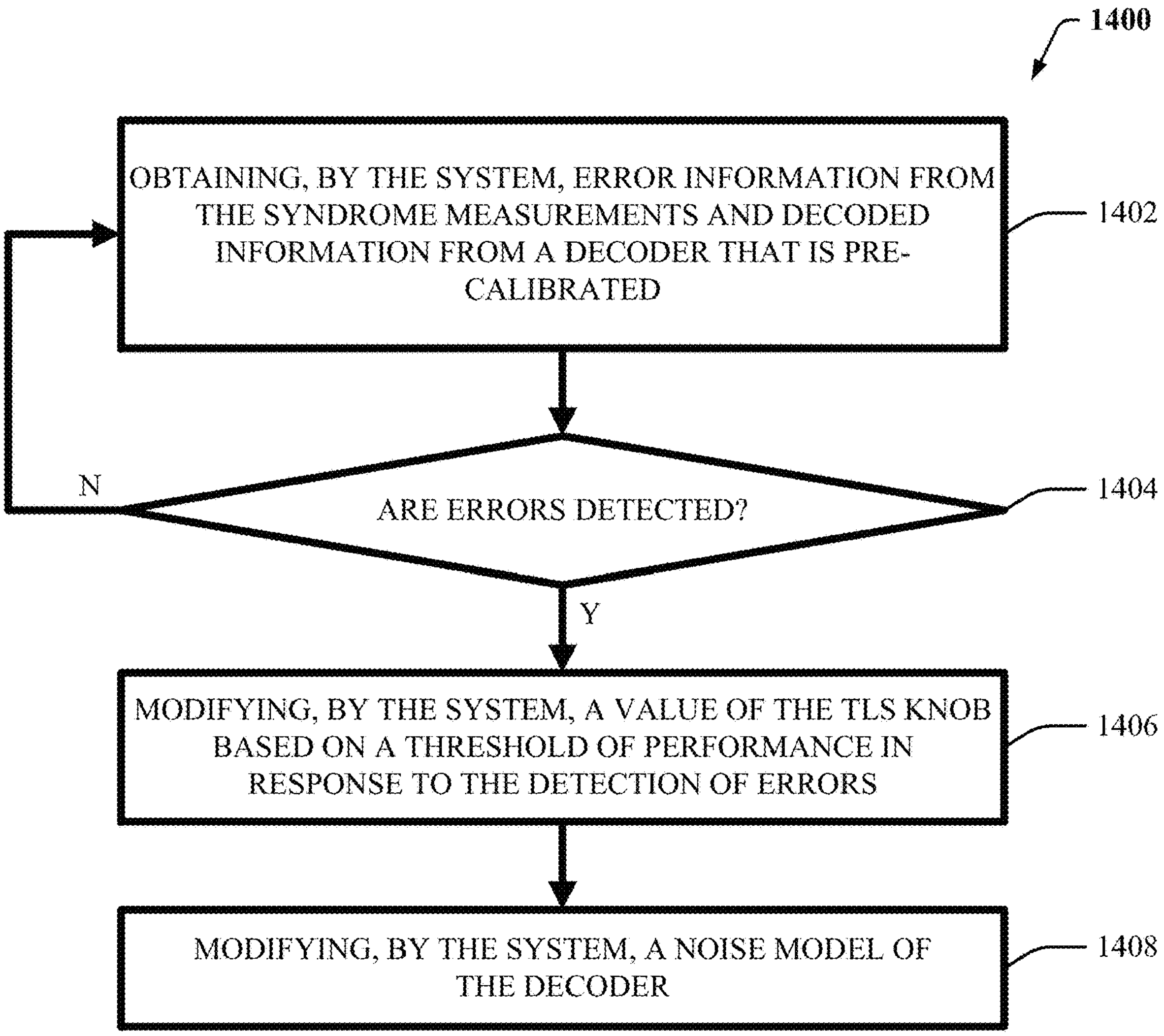
FIG. 14 illustrates a flow diagram of an example, non-limiting method that can facilitate modulation of qubit-TLS environments for quantum error correction in accordance with one or more embodiments described herein.

FIG. 14 illustrates a flow diagram of an example, non-limiting method 1400 that can facilitate modulation of qubit-TLS environments for quantum error correction in accordance with one or more embodiments described herein. Repetitive description of like elements and/or processes employed in respective embodiments is omitted for sake of brevity.

At 1402, the non-limiting method 1400 can comprise obtaining (e.g., by detection component 112), by a system operatively coupled to processor, error information from the syndrome measurements and decoded information from a decoder that is pre-calibrated.

At 1404, the non-limiting method 1400 can comprise determining (e.g., by detection component 112), by the system, if errors are detected. If no (e.g., errors are not detected), the non-limiting method 1400 can proceed to 1402. If yes (e.g., errors are detected), the non-limiting method 1400 can proceed to 1406.

At 1406, the non-limiting method 1400 can comprise modifying (e.g., by modulation component 114), by the system and via a TLS knob, a value of the TLS knob based on a threshold of performance in response to the detection of errors.

At 1408, the non-limiting method 1400 can comprise modifying (e.g., by modulation component 114), by the system, a noise model of the decoder.

Figure 15:
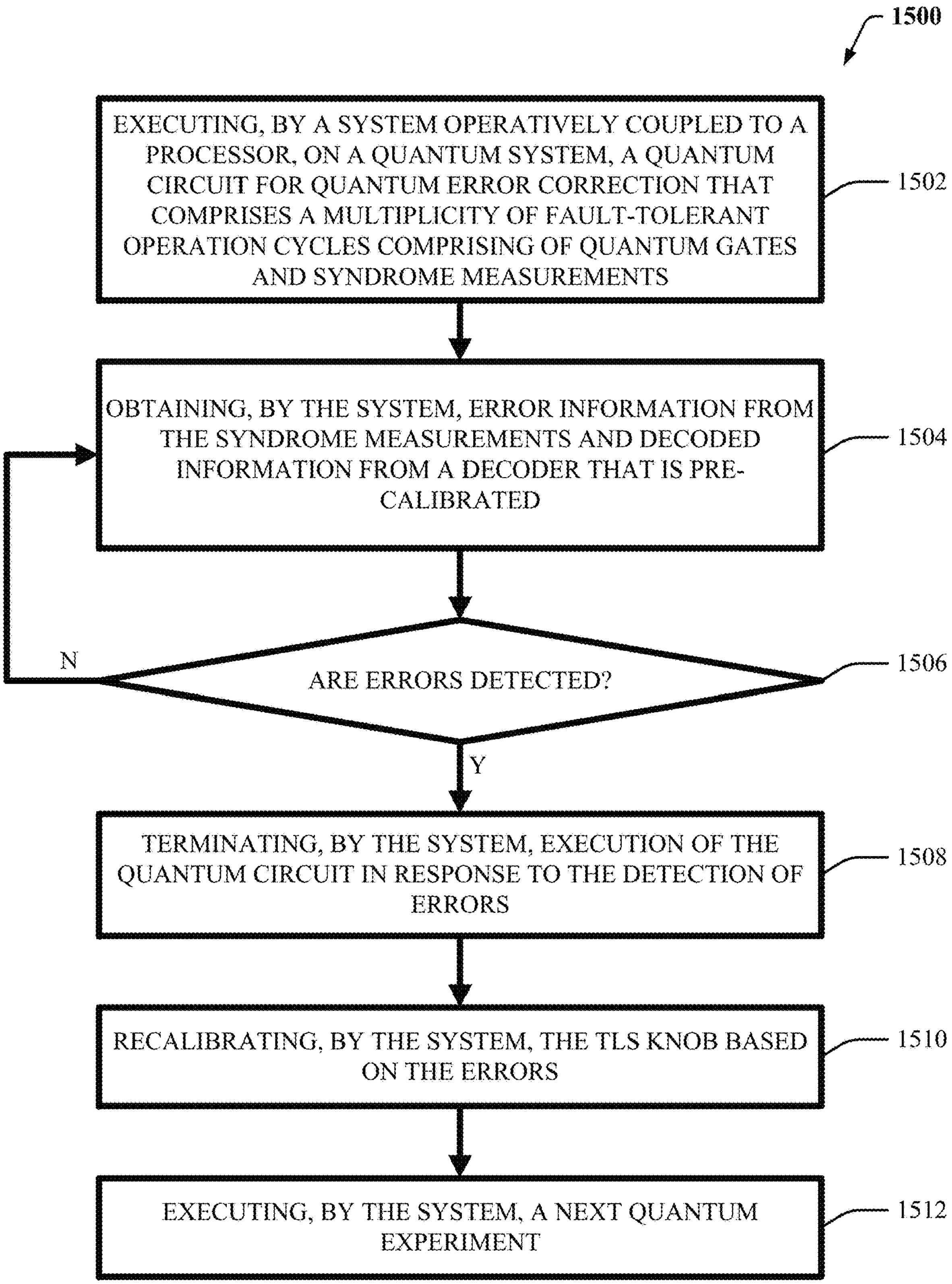
FIG. 15 illustrates a flow diagram of an example, non-limiting method that can facilitate modulation of qubit-TLS environments for quantum error correction in accordance with one or more embodiments described herein.

FIG. 15 illustrates a flow diagram of an example, non-limiting method 1500 that can facilitate modulation of qubit-TLS environments for quantum error correction in accordance with one or more embodiments described herein. Repetitive description of like elements and/or processes employed in respective embodiments is omitted for sake of brevity.

At 1502, the non-limiting method 1500 can comprise executing (e.g., by execution component 110), by a system operatively coupled to processor, a quantum circuit for quantum error correction that comprises a multiplicity of fault-tolerant operation cycles comprising of quantum gates and syndrome measurements.

At 1504, the non-limiting method 1500 can comprise obtaining (e.g., by detection component 112), by the system, error information from the syndrome measurements and decoded information from a decoder that is pre-calibrated At 1506, the non-limiting method 1500 can comprise determining (e.g., by detection component 112), by the system, if errors are detected. If no (e.g., errors are not detected), the non-limiting method 1500 can proceed to 1504. If yes (e.g., errors are detected), the non-limiting method 1500 can proceed to 1508.

At 1508, the non-limiting method 1500 can comprise terminating (e.g., by modulation component 114), by the system, execution of the quantum circuit in response to the detection of errors.

At 1510, the non-limiting method 1500 can comprise recalibrating (e.g., by modulation component 114), by the system, the TLS knob based on the errors.

At 1512, the non-limiting method 1500 can comprise executing (e.g., by execution component 110), by the system, a next quantum experiment.

In various aspects, non-limiting method 1500 can be performed on one or more quantum circuits. That is, the non-limiting method 1500 can comprise executing (e.g., by execution component 110), by the system, more than one quantum circuit.

For simplicity of explanation, the computer-implemented and non-computer-implemented methodologies provided herein are depicted and/or described as a series of acts. It is to be understood that the subject innovation is not limited by the acts illustrated and/or by the order of acts, for example acts can occur in one or more orders and/or concurrently, and with other acts not presented and described herein. Furthermore, not all illustrated acts can be utilized to implement the computer-implemented and non-computer-implemented methodologies in accordance with the described subject matter. Additionally, the computer-implemented methodologies described hereinafter and throughout this specification are capable of being stored on an article of manufacture to enable transporting and transferring the computer-implemented methodologies to computers. The term article of manufacture, as used herein, is intended to encompass a computer program accessible from any computer-readable device or storage media.

The systems and/or devices have been (and/or will be further) described herein with respect to interaction between one or more components. Such systems and/or components can include those components or sub-components specified therein, one or more of the specified components and/or sub-components, and/or additional components. Sub-components can be implemented as components communicatively coupled to other components rather than included within parent components. One or more components and/or sub-components can be combined into a single component providing aggregate functionality. The components can interact with one or more other components not specifically described herein for the sake of brevity, but known by those of skill in the art.

One or more embodiments described herein can employ hardware and/or software to solve problems that are highly technical, that are not abstract, and that cannot be performed as a set of mental acts by a human. For example, a human, or even thousands of humans, cannot efficiently, accurately and/or effectively modulate qubit-TLS environments for quantum error correction as the one or more embodiments described herein can enable this process. And, neither can the human mind nor a human with pen and paper modulate qubit-TLS environments for quantum error correction, as conducted by one or more embodiments described herein.

It is to be appreciated that TLS modulation for quantum error correction system 102 can utilize various combination of electrical components, mechanical components, and circuitry that cannot be replicated in the mind of a human or performed by a human as the various operations that can be executed by TLS modulation for quantum error correction system 102 and/or components thereof as described herein are operations that are greater than the capability of a human mind. For instance, the amount of data processed, the speed of processing such data, or the types of data processed by TLS modulation for quantum error correction system 102 over a certain period of time can be greater, faster, or different than the amount, speed, or data type that can be processed by a human mind over the same period of time. According to several embodiments, TLS modulation for quantum error correction system 102 can also be fully operational towards performing one or more other functions (e.g., fully powered on, fully executed, and/or another function) while also performing the various operations described herein. It should be appreciated that such simultaneous multi-operational execution is beyond the capability of a human mind. It should be appreciated that TLS modulation for quantum error correction system 102 can include information that is impossible to obtain manually by an entity, such as a human user. For example, the type, amount, and/or variety of information included in TLS modulation for quantum error correction system 102 can be more complex than information obtained manually by an entity, such as a human user.

Embodiments discussed herein can provide a number of advantages to quantum computing systems, including efficient quantum error correction to allow for increased computation size that a quantum circuit can execute, reduced overhead, and improved performance of qubits. TLS modulation for quantum error correction system 102 can provide technical improvements to a processing unit associated with TLS modulation for quantum error correction system 102. For example, by modulating the qubit-TLS environment and applying QEC during execution of a quantum circuit, outlier events in QEC can be mitigated and computation time to execute (e.g., or rerun) the quantum circuit can be reduced, thereby reducing the workload of a processing unit (e.g., processor 104) and a quantum processing unit (e.g., processor 514). In this example, by reducing the workload of such a processing unit (e.g., processor 104, processor 514), TLS modulation for quantum error correction system 102 can thereby facilitate improved performance, improved efficiency, and/or reduced computational cost associated with such processing units. TLS modulation for quantum error correction system 102 can thereby facilitate improved performance, improved efficiency, and/or reduced computational cost associated with quantum computation on a quantum processor.

A practical application of TLS modulation for quantum error correction system 102 is that it allows for efficient and effective QEC of a quantum circuit, in comparison to other methods. For example, QEC can be limited in the size of the quantum circuit it can execute due to high error rates, which limits the capability and applications of QEC. By modulating the qubit-TLS environment and applying QEC during execution of a quantum circuit, TLS modulation for quantum error correction system 102 can enable QEC with improved scalability, improved performance, decreased computation requirements, and improved processing efficiency. Therefore, TLS modulation for quantum error correction system 102 can enable quantum error correction that can be operated with reduced quantum and classical hardware requirements, thus promoting efficient quantum error correction.

Figure 16:
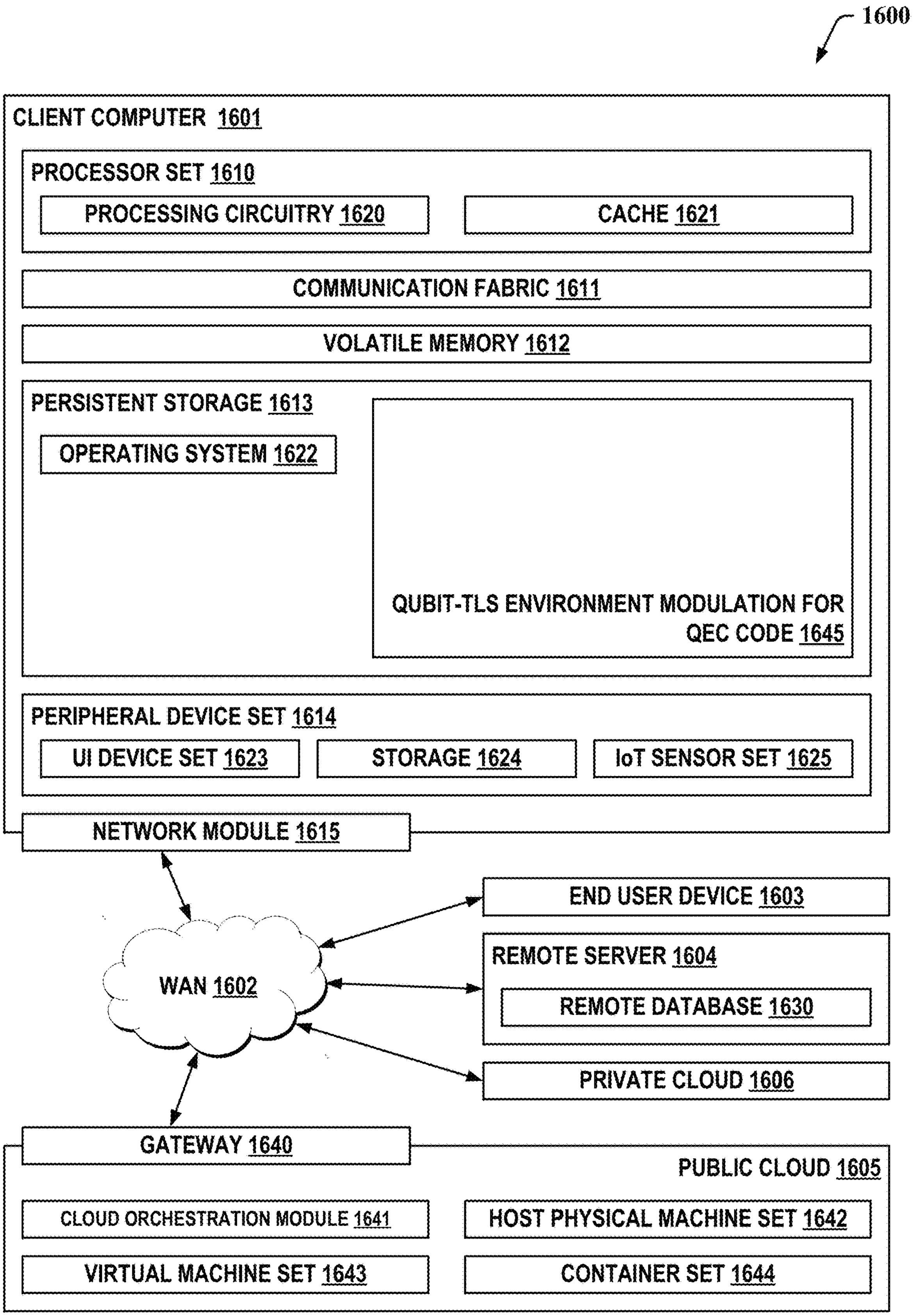
FIG. 16 illustrates a block diagram of an example, non-limiting operating environment in which one or more embodiments described herein can be facilitated.

FIG. 16 illustrates a block diagram of an example, non-limiting operating environment 1600 in which one or more embodiments described herein can be facilitated. FIG. 16 and the following discussion are intended to provide a general description of a suitable operating environment 1600 in which one or more embodiments described herein at FIGS. 1-9 can be implemented.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 1600 contains an example of an environment for the execution of at least some of the computer code involved in performing the inventive methods, such as qubit-TLS environment modulation for QEC code 1645. In addition to block 1645, computing environment 1600 includes, for example, computer 1601, wide area network (WAN) 1602, end user device (EUD) 1603, remote server 1604, public cloud 1605, and private cloud 1606. In this embodiment, computer 1601 includes processor set 1610 (including processing circuitry 1650 and cache 1651), communication fabric 1611, volatile memory 1612, persistent storage 1613 (including operating system 1652 and block 1645, as identified above), peripheral device set 1614 (including user interface (UI), device set 1623, storage 1624, and Internet of Things (IoT) sensor set 1625), and network module 1615. Remote server 1604 includes remote database 1630. Public cloud 1605 includes gateway 1640, cloud orchestration module 1641, host physical machine set 1642, virtual machine set 1643, and container set 1644.

COMPUTER 1601 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1630. As is well understood in the art of computer technology, and depending upon the technology, performance of a computer-implemented method may be distributed among multiple computers and/or between multiple locations. On the other hand, in this presentation of computing environment 1600, detailed discussion is focused on a single computer, specifically computer 1601, to keep the presentation as simple as possible. Computer 1601 may be located in a cloud, even though it is not shown in a cloud in FIG. 8. On the other hand, computer 1601 is not required to be in a cloud except to any extent as may be affirmatively indicated.

PROCESSOR SET 1610 includes one, or more, computer processors of any type now known or to be developed in the future. Processing circuitry 1650 may be distributed over multiple packages, for example, multiple, coordinated integrated circuit chips. Processing circuitry 1650 may implement multiple processor threads and/or multiple processor cores. Cache 1651 is memory that is located in the processor chip package(s) and is typically used for data or code that should be available for rapid access by the threads or cores running on processor set 1610. Cache memories are typically organized into multiple levels depending upon relative proximity to the processing circuitry. Alternatively, some, or all, of the cache for the processor set may be located "off chip." In some computing environments, processor set 1610 may be designed for working with qubits and performing quantum computing.

Computer readable program instructions are typically loaded onto computer 1601 to cause a series of operational steps to be performed by processor set 1610 of computer 1601 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1651 and the other storage media discussed below. The program instructions, and associated data, are accessed by processor set 1610 to control and direct performance of the inventive methods. In computing environment 1600, at least some of the instructions for performing the inventive methods may be stored in block 1645 in persistent storage 1613.

COMMUNICATION FABRIC 1611 is the signal conduction paths that allow the various components of computer 1601 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 1612 is any type of volatile memory now known or to be developed in the future. Examples include dynamic type random access memory (RAM) or static type RAM. Typically, the volatile memory is characterized by random access, but this is not required unless affirmatively indicated. In computer 1601, the volatile memory 1612 is located in a single package and is internal to computer 1601, but, alternatively or additionally, the volatile memory may be distributed over multiple packages and/or located externally with respect to computer 1601.

PERSISTENT STORAGE 1613 is any form of non-volatile storage for computers that is now known or to be developed in the future. The non-volatility of this storage means that the stored data is maintained regardless of whether power is being supplied to computer 1601 and/or directly to persistent storage 1613. Persistent storage 1613 may be a read only memory (ROM), but typically at least a portion of the persistent storage allows writing of data, deletion of data and re-writing of data. Some familiar forms of persistent storage include magnetic disks and solid state storage devices. Operating system 1652 may take several forms, such as various known proprietary operating systems or open source Portable Operating System Interface type operating systems that employ a kernel. The code included in block 1645 typically includes at least some of the computer code involved in performing the inventive methods.

PERIPHERAL DEVICE SET 1614 includes the set of peripheral devices of computer 1601. Data communication connections between the peripheral devices and the other components of computer 1601 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 1623 may include components such as a display screen, speaker, microphone, wearable devices (such as goggles and smart watches), keyboard, mouse, printer, touchpad, game controllers, and haptic devices. Storage 1624 is external storage, such as an external hard drive, or insertable storage, such as an SD card. Storage 1624 may be persistent and/or volatile. In some embodiments, storage 1624 may take the form of a quantum computing storage device for storing data in the form of qubits. In embodiments where computer 1601 is required to have a large amount of storage (for example, where computer 1601 locally stores and manages a large database) then this storage may be provided by peripheral storage devices designed for storing very large amounts of data, such as a storage area network (SAN) that is shared by multiple, geographically distributed computers. IoT sensor set 1625 is made up of sensors that can be used in Internet of Things applications. For example, one sensor may be a thermometer and another sensor may be a motion detector.

NETWORK MODULE 1615 is the collection of computer software, hardware, and firmware that allows computer 1601 to communicate with other computers through WAN 1602. Network module 1615 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1615 are performed on the same physical hardware device. In other embodiments (for example, embodiments that utilize software-defined networking (SDN)), the control functions and the forwarding functions of network module 1615 are performed on physically separate devices, such that the control functions manage several different network hardware devices. Computer readable program instructions for performing the inventive methods can typically be downloaded to computer 1601 from an external computer or external storage device through a network adapter card or network interface included in network module 1615.

WAN 1602 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1603 is any computer system that is used and controlled by an end user (for example, a customer of an enterprise that operates computer 1601), and may take any of the forms discussed above in connection with computer 1601. EUD 1603 typically receives helpful and useful data from the operations of computer 1601. For example, in a hypothetical case where computer 1601 is designed to provide a recommendation to an end user, this recommendation would typically be communicated from network module 1615 of computer 1601 through WAN 1602 to EUD 1603. In this way, EUD 1603 can display, or otherwise present, the recommendation to an end user. In some embodiments, EUD 1603 may be a client device, such as thin client, heavy client, mainframe computer, desktop computer and so on.

REMOTE SERVER 1604 is any computer system that serves at least some data and/or functionality to computer 1601. Remote server 1604 may be controlled and used by the same entity that operates computer 1601. Remote server 1604 represents the machine(s) that collect and store helpful and useful data for use by other computers, such as computer 1601. For example, in a hypothetical case where computer 1601 is designed and programmed to provide a recommendation based on historical data, then this historical data may be provided to computer 1601 from remote database 1630 of remote server 1604.

PUBLIC CLOUD 1605 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 1605 is performed by the computer hardware and/or software of cloud orchestration module 1641. The computing resources provided by public cloud 1605 are typically implemented by virtual computing environments that run on various computers making up the computers of host physical machine set 1642, which is the universe of physical computers in and/or available to public cloud 1605. The virtual computing environments (VCEs) typically take the form of virtual machines from virtual machine set 1643 and/or containers from container set 1644. It is understood that these VCEs may be stored as images and may be transferred among and between the various physical machine hosts, either as images or after instantiation of the VCE. Cloud orchestration module 1641 manages the transfer and storage of images, deploys new instantiations of VCEs and manages active instantiations of VCE deployments. Gateway 1640 is the collection of computer software, hardware, and firmware that allows public cloud 1605 to communicate through WAN 1602.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1606 is similar to public cloud 1605, except that the computing resources are only available for use by a single enterprise. While private cloud 1606 is depicted as being in communication with WAN 1602, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1605 and private cloud 1606 are both part of a larger hybrid cloud.

The embodiments described herein can be directed to one or more of a system, a method, an apparatus and/or a computer program product at any possible technical detail level of integration. The computer program product can include a computer readable storage medium (or media) having computer readable program instructions thereon for causing a processor to carry out aspects of the one or more embodiments described herein. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a superconducting storage device and/or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon and/or any suitable combination of the foregoing. A computer readable storage medium, as used herein, is not to be construed as being transitory signals per se, such as radio waves and/or other freely propagating electromagnetic waves, electromagnetic waves propagating through a waveguide and/or other transmission media (e.g., light pulses passing through a fiber-optic cable), and/or electrical signals transmitted through a wire.

Computer readable program instructions described herein can be downloaded to respective computing/processing devices from a computer readable storage medium and/or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the one or more embodiments described herein can be assembler instructions, instruction-set-architecture (ISA) instructions, machine instructions, machine dependent instructions, microcode, firmware instructions, state-setting data, configuration data for integrated circuitry, and/or source code and/or object code written in any combination of one or more programming languages, including an object oriented programming language such as Smalltalk, C++ or the like, and/or procedural programming languages, such as the "C" programming language and/or similar programming languages. The computer readable program instructions can execute entirely on a computer, partly on a computer, as a stand-alone software package, partly on a computer and/or partly on a remote computer or entirely on the remote computer and/or server. In the latter scenario, the remote computer can be connected to a computer through any type of network, including a local area network (LAN) and/or a wide area network (WAN), and/or the connection can be made to an external computer (for example, through the Internet using an Internet Service Provider). In one or more embodiments, electronic circuitry including, for example, programmable logic circuitry, field-programmable gate arrays (FPGA) and/or programmable logic arrays (PLA) can execute the computer readable program instructions by utilizing state information of the computer readable program instructions to personalize the electronic circuitry, in order to perform aspects of the one or more embodiments described herein.

Aspects of the one or more embodiments described herein are described with reference to flowchart illustrations and/or block diagrams of methods, apparatus (systems), and computer program products according to one or more embodiments described herein. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general-purpose computer, special purpose computer and/or other programmable data processing apparatus to produce a machine, such that the instructions, which execute via the processor of the computer or other programmable data processing apparatus, can create means for implementing the functions/acts specified in the flowchart and/or block diagram block or blocks. These computer readable program instructions can also be stored in a computer readable storage medium that can direct a computer, a programmable data processing apparatus and/or other devices to function in a particular manner, such that the computer readable storage medium having instructions stored therein can comprise an article of manufacture including instructions which can implement aspects of the function/act specified in the flowchart and/or block diagram block or blocks. The computer readable program instructions can also be loaded onto a computer, other programmable data processing apparatus and/or other device to cause a series of operational acts to be performed on the computer, other programmable apparatus and/or other device to produce a computer implemented process, such that the instructions which execute on the computer, other programmable apparatus and/or other device implement the functions/acts specified in the flowchart and/or block diagram block or blocks.

The flowcharts and block diagrams in the figures illustrate the architecture, functionality and/or operation of possible implementations of systems, computer-implementable methods and/or computer program products according to one or more embodiments described herein. In this regard, each block in the flowchart or block diagrams can represent a module, segment and/or portion of instructions, which comprises one or more executable instructions for implementing the specified logical function. In one or more alternative implementations, the functions noted in the blocks can occur out of the order noted in the Figures. For example, two blocks shown in succession can be executed substantially concurrently, and/or the blocks can sometimes be executed in the reverse order, depending upon the functionality involved. It will also be noted that each block of the block diagrams and/or flowchart illustration, and/or combinations of blocks in the block diagrams and/or flowchart illustration, can be implemented by special purpose hardware-based systems that can perform the specified functions and/or acts and/or carry out one or more combinations of special purpose hardware and/or computer instructions.

While the subject matter has been described above in the general context of computer-executable instructions of a computer program product that runs on a computer and/or computers, those skilled in the art will recognize that the one or more embodiments herein also can be implemented at least partially in parallel with one or more other program modules. Generally, program modules include routines, programs, components and/or data structures that perform particular tasks and/or implement particular abstract data types. Moreover, the aforedescribed computer-implemented methods can be practiced with other computer system configurations, including single-processor and/or multiprocessor computer systems, mini-computing devices, mainframe computers, as well as computers, hand-held computing devices (e.g., PDA, phone), and/or microprocessor-based or programmable consumer and/or industrial electronics. The illustrated aspects can also be practiced in distributed computing environments in which tasks are performed by remote processing devices that are linked through a communications network. However, one or more, if not all aspects of the one or more embodiments described herein can be practiced on stand-alone computers. In a distributed computing environment, program modules can be located in both local and remote memory storage devices.

As used in this application, the terms "component," "system," "platform" and/or "interface" can refer to and/or can include a computer-related entity or an entity related to an operational machine with one or more specific functionalities. The entities described herein can be either hardware, a combination of hardware and software, software, or software in execution. For example, a component can be, but is not limited to being, a process running on a processor, a processor, an object, an executable, a thread of execution, a program and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system and/or across a network such as the Internet with other systems via the signal). As another example, a component can be an apparatus with specific functionality provided by mechanical parts operated by electric or electronic circuitry, which is operated by a software and/or firmware application executed by a processor. In such a case, the processor can be internal and/or external to the apparatus and can execute at least a part of the software and/or firmware application. As yet another example, a component can be an apparatus that provides specific functionality through electronic components without mechanical parts, where the electronic components can include a processor and/or other means to execute software and/or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter described herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit and/or device comprising, but not limited to, single-core processors; single-processors with software multithread execution capability; multi-core processors; multi-core processors with software multithread execution capability; multi-core processors with hardware multithread technology; parallel platforms; and/or parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, and/or any combination thereof designed to perform the functions described herein. Further, processors can exploit nano-scale architectures such as, but not limited to, molecular and quantum-dot based transistors, switches and/or gates, in order to optimize space usage and/or to enhance performance of related equipment. A processor can be implemented as a combination of computing processing units.

Herein, terms such as "store," "storage," "data store," data storage," "database," and substantially any other information storage component relevant to operation and functionality of a component are utilized to refer to "memory components," entities embodied in a "memory," or components comprising a memory. Memory and/or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory and/or nonvolatile random-access memory (RAM) (e.g., ferroelectric RAM (FeRAM). Volatile memory can include RAM, which can act as external cache memory, for example. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM) and/or Rambus dynamic RAM (RDRAM). Additionally, the described memory components of systems and/or computer-implemented methods herein are intended to include, without being limited to including, these and/or any other suitable types of memory.

What has been described above includes mere examples of systems and computer-implemented methods. It is, of course, not possible to describe every conceivable combination of components and/or computer-implemented methods for purposes of describing the one or more embodiments, but one of ordinary skill in the art can recognize that many further combinations and/or permutations of the one or more embodiments are possible. Furthermore, to the extent that the terms "includes," "has," "possesses," and the like are used in the detailed description, claims, appendices and/or drawings such terms are intended to be inclusive in a manner similar to the term "comprising" as "comprising" is interpreted when employed as a transitional word in a claim.

The descriptions of the various embodiments have been presented for purposes of illustration but are not intended to be exhaustive or limited to the embodiments described herein. Many modifications and variations will be apparent to those of ordinary skill in the art without departing from the scope and spirit of the described embodiments. The terminology used herein was chosen to best explain the principles of the embodiments, the practical application and/or technical improvement over technologies found in the marketplace, and/or to enable others of ordinary skill in the art to understand the embodiments described herein.

What is claimed is:

1. A system, comprising:

a memory that stores computer executable components; and a processor that executes at least one of the computer executable components that:

executes, on a quantum system, a quantum circuit for quantum error correction that comprises a multiplicity of fault-tolerant operation cycles comprising of quantum gates and syndrome measurements;

obtains, during execution of the quantum circuit, error information from the syndrome measurements or from decoded information from a decoder that is pre-calibrated; and modulates, based on the error information and via a two-level system (TLS) knob, a qubit-TLS environment by controlling the TLS knob in response to the error information, during execution of the quantum circuit or after execution of a series of the fault-tolerant operation cycles in response to a detection of errors, wherein modulating the qubit-TLS environment during execution of the quantum circuit comprises:

modulating the TLS knob with a calibrated time variation that is adjusted based on correlated error events detected from consecutive fault-tolerant operation cycles;

and wherein modulating the qubit-TLS environment after execution of the series of fault-tolerant operation cycles comprises:

post-processing measurement outcomes based on the error information, and updating at least one control parameter of the TLS knob or a noise model of the decoder based on the post-processed measurement outcomes to influence subsequent modulation of the qubit-TLS environment.

2. The system of claim 1, wherein at least one of the computer executable components further:

modifies a value of the TLS knob based on a threshold of performance in response to the detection of errors; and modifies the noise model of the decoder in response to the detection of errors.

3. The system of claim 1, wherein at least one of the computer executable components further:

selects a set of parameters based on prior measurements of the execution of the quantum circuit to repair a qubit or the quantum gates in response to the detection of errors; or excludes inoperable qubits or inoperable quantum gates from quantum error correction code by applying code deformation.

4. The system of claim 1, wherein at least one of the computer executable components further:

repairs, on the quantum system, a qubit or the quantum gates in response to the detection of errors, wherein repairing the qubit or the quantum gates comprises:

swapping the qubit or the quantum gates with an error-free qubit tile; and swapping the error-free qubit tile with the qubit or the quantum gates in response to correcting the errors of the qubit or the quantum gates.

5. The system of claim 1, wherein modulating the qubit-TLS environment after execution of the quantum circuit comprises:

executing, on the quantum system, one or more quantum circuits;

collecting the syndrome measurements or the decoded information from fault-tolerant operation cycles in one or more quantum circuits;

detecting the errors based on the syndrome measurements or the decoded information; and terminating execution of the one or more quantum circuits in response to the detection of errors.

6. The system of claim 5, wherein at least one of the computer executable components further:

recalibrates the TLS knob based on the errors; and implements a noise model of the decoder based on the errors.

7. The system of claim 5, wherein at least one of the computer executable components further:

interleaves a test circuit with the quantum circuit; and terminates the execution of the one or more quantum circuits based on outcomes of the test circuit.

8. The system of claim 1, wherein at least one of the computer executable components further:

detects a correlated error event from consecutive syndrome measurements; and modulates the TLS knob based on a detection of the correlated error event.

9. The system of claim 1, wherein at least one of the computer executable components further:
selects a bias point of the qubit-TLS environment based on detected error events.

10. A computer-implemented method, comprising:
executing, by a system operatively coupled to a processor, on a quantum system, a quantum circuit for quantum error correction that comprises a multiplicity of fault-tolerant operation cycles comprising of quantum gates and syndrome measurements;
obtaining, by the system, for each of the fault-tolerant operation cycles, error information from the syndrome measurements or decoded information from a decoder that is pre-calibrated;
modulating, by the system and via modulation of a two-level system (TLS) knob, a qubit-TLS environment during execution of the quantum circuit or after execution of a series of the fault-tolerant operation cycles in response to a detection of errors, wherein modulating the qubit-TLS environment during execution of the quantum circuit comprises:
modulating the TLS knob with a calibrated time variation that is determined based on error information obtained across a plurality of the fault-tolerant operation cycles;
and wherein modulating the qubit-TLS environment after execution of the series of fault-tolerant operation cycles comprises:
post-processing measurement outcomes based on the error information, generating an updated characterization of the errors based on the post-processing, and applying the updated characterization of the errors to adjust at least one subsequent execution of the quantum circuit or subsequent modulation of the TLS knob.

11. The computer-implemented method of claim 10, further comprising:
modifying, by the system, a value of the TLS knob based on a threshold of performance in response to the detection of errors; and
modifying, by the system, a noise model of the decoder in response to the detection of errors.

12. The computer-implemented method of claim 10, further comprising:
selecting, by the system, a set of parameters based on prior measurements of the execution of the quantum circuit to repair a qubit or the quantum gates in response to the detection of errors; or
excluding, by the system, inoperable qubits or inoperable quantum gates from quantum error correction code by applying code deformation.

13. The computer-implemented method of claim 10, further comprising:
repairing, by the system, on the quantum system, a qubit or the quantum gates in response to the detection of errors, wherein repairing the qubit or the quantum gates comprises:
swapping the qubit or the quantum gates with an error-free qubit tile; and
swapping the error-free qubit tile with the qubit or the quantum gates in response to correcting the errors of the qubit or the quantum gates.

14. The computer-implemented method of claim 10, wherein modulating the qubit-TLS environment after execution of the quantum circuit comprises:
executing, on the quantum system, one or more quantum circuits; and
collecting the syndrome measurements or the decoded information from the one or more quantum circuits;
detecting the errors based on the syndrome measurements or the decoded information; and
terminating execution of the one or more quantum circuits in response to the detection of errors.

15. The computer-implemented method of claim 14, further comprising:
recalibrating, by the system, the TLS knob based on the errors; and
implementing, by the system, a noise model of the decoder based on the errors.

16. The computer-implemented method of claim 14, further comprising:
interleaving, by the system, a test circuit with the quantum circuit; and
terminating, by the system, the execution of the one or more quantum circuits based on outcomes of the test circuit.

17. The computer-implemented method of claim 10, further comprising:
detecting, by the system, a correlated error event from consecutive syndrome measurements; and
modulating, by the system, the TLS knob based on a detection of the correlated error event.

18. A computer program product for qubit-two-level-system (TLS) environment modulation for quantum error correction, the computer program product comprising a computer readable storage medium having program instructions embodied therewith, the program instructions executable by a processor to cause the processor to:
execute, on a quantum system, a quantum circuit for quantum error correction that comprises a multiplicity of fault-tolerant operation cycles comprising of quantum gates and syndrome measurements;
obtain error information from the syndrome measurements or decoded information from a decoder that is pre-calibrated; and
modulate, based on the error information and via modulation of a TLS knob, a qubit-TLS environment during execution of the quantum circuit or after execution of a series of the fault-tolerant operation cycles in response to a detection of errors, wherein modulating the qubit-TLS environment during execution of the quantum circuit comprises:
modulating the TLS knob with a calibrated time variation that is selected based on detected error conditions associated with the fault-tolerant operation cycles;
and wherein modulating the qubit-TLS environment after execution of the series of fault-tolerant operation cycles comprises:
post-processing measurement outcomes based on the error information, determining whether a condition associated with the detection of errors satisfies a threshold condition, and, based on the determination, selectively modifying at least one of: subsequent execution of the quantum circuit or modulation of the TLS knob.

19. The computer program product of claim 18, wherein the program instructions executable by the processor further cause the processor to:
modify a value of the TLS knob based on a threshold of performance in response to the detection of errors; and
modify a noise model of the decoder in response to the detection of errors.

20. The computer program product of claim 18, wherein modulating the qubit-TLS environment after execution of the quantum circuit comprises:

executing, on the quantum system, one or more quantum circuits; and collecting the syndrome measurements or the decoded information from the one or more quantum circuits;

detecting the errors based on the syndrome measurements or the decoded information; and terminating execution of the one or more quantum circuits in response to the detection of errors.

* * * * *